United States Patent
Yuzawa et al.

(10) Patent No.: US 9,239,998 B2
(45) Date of Patent: Jan. 19, 2016

(54) INFORMATION PROCESSING APPARATUS, INFORMATION PROCESSING METHOD, AND COMPUTER READABLE MEDIUM STORING PROGRAM

(75) Inventors: Hideto Yuzawa, Kanagawa (JP); Toshiroh Shimada, Kanagawa (JP); Tomoyuki Shoya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 762 days.

(21) Appl. No.: 13/442,541

(22) Filed: Apr. 9, 2012

(65) Prior Publication Data

US 2013/0096860 A1 Apr. 18, 2013

(30) Foreign Application Priority Data

Oct. 12, 2011 (JP) ................................ 2011-225304

(51) Int. Cl.
*G06F 19/00* (2011.01)
*G06Q 10/06* (2012.01)
*G06K 9/00* (2006.01)

(52) U.S. Cl.
CPC .... *G06Q 10/063114* (2013.01); *G06K 9/00496* (2013.01); *G06K 9/00778* (2013.01)

(58) Field of Classification Search
CPC .................. G06Q 10/063114; G06K 9/00778; G06K 9/00496
USPC .......................... 702/120, 122, 149, 150, 158
See application file for complete search history.

(56) References Cited

U.S. PATENT DOCUMENTS

2007/0149208 A1* 6/2007 Syrbe et al. ................. 455/456.1
2012/0165035 A1* 6/2012 Chen et al. ................. 455/456.1

FOREIGN PATENT DOCUMENTS

| JP | 200329832 A | 1/2003 |
|---|---|---|
| JP | 2006250792 A | 9/2006 |
| JP | 2007-026311 A | 2/2007 |
| JP | 2007-140800 A | 6/2007 |

OTHER PUBLICATIONS

Japanese Unexamined Patent Application Publication No. 2007-026311.
Japanese Unexamined Patent Application Publication No. 2007-140800.
Communication dated Apr. 21, 2015, issued by the Japanese Patent Office in counterpart Application No. 2011-225304.

* cited by examiner

*Primary Examiner* — Mohamed Charioui
*Assistant Examiner* — Zannatul Ferdous
(74) *Attorney, Agent, or Firm* — Sughrue Mion, PLLC

(57) ABSTRACT

An information processing apparatus includes an analysis unit, a gathering place determination unit, and a correction unit. The analysis unit analyzes an action history including at least a position of a subject, in accordance with action information obtained by detecting an action of the subject. The gathering place determination unit determines a position of a gathering place where plural subjects including the subject are together, in accordance with position information indicating the position of the subject which is included in the action information. The correction unit corrects position information about the subject, in accordance with the position of the gathering place determined by the gathering place determination unit.

8 Claims, 24 Drawing Sheets

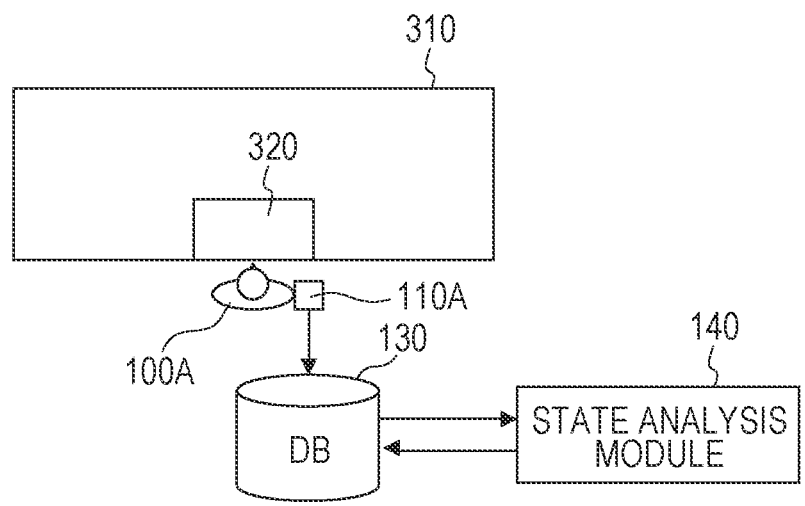

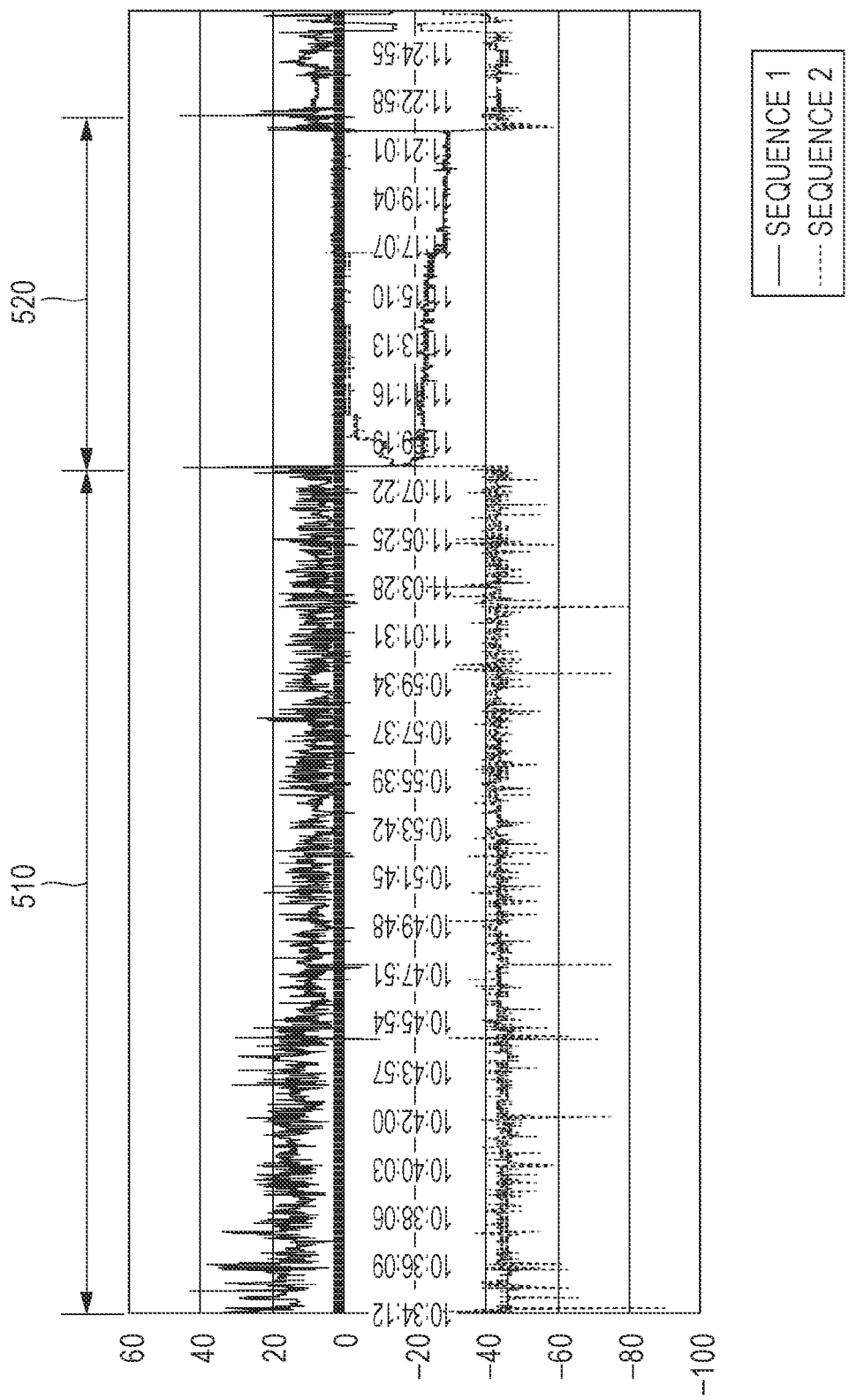

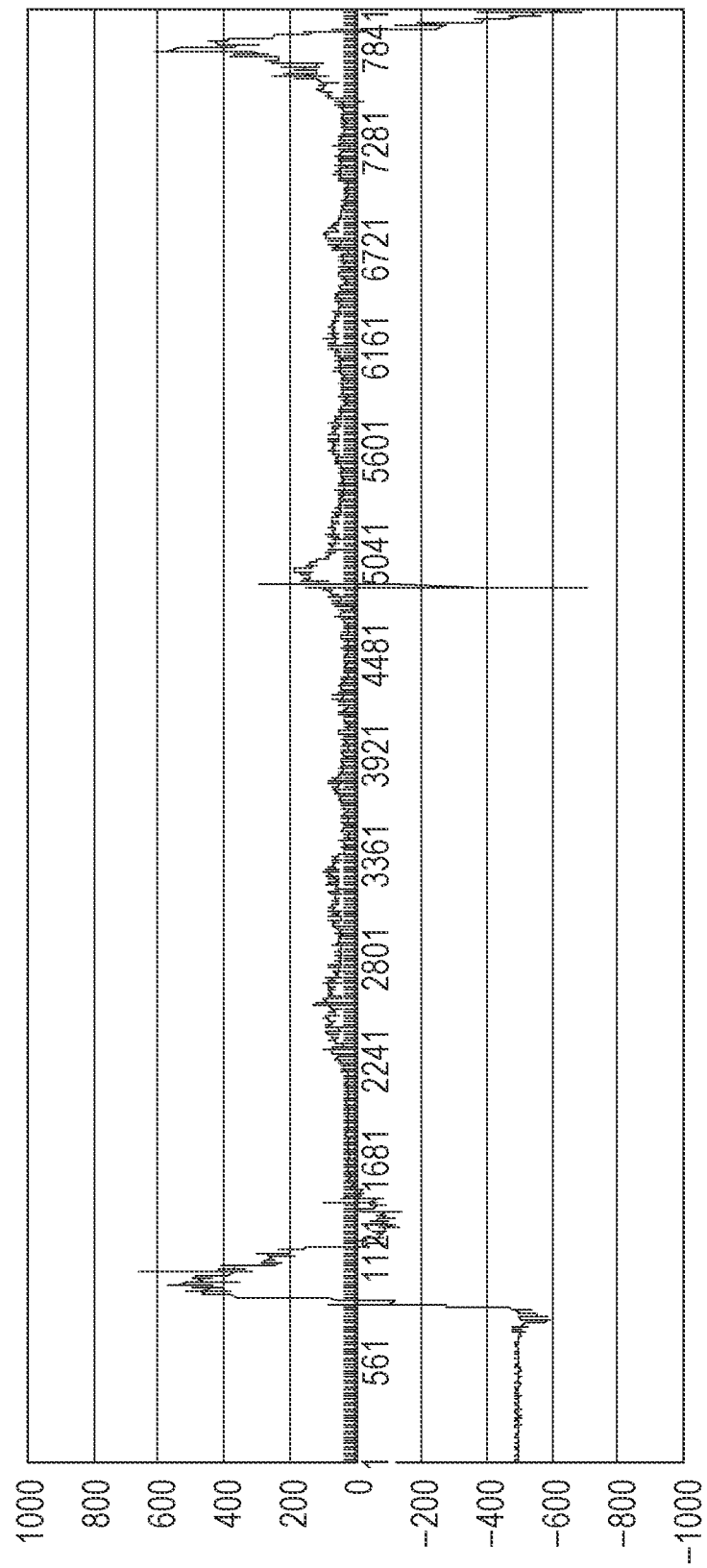

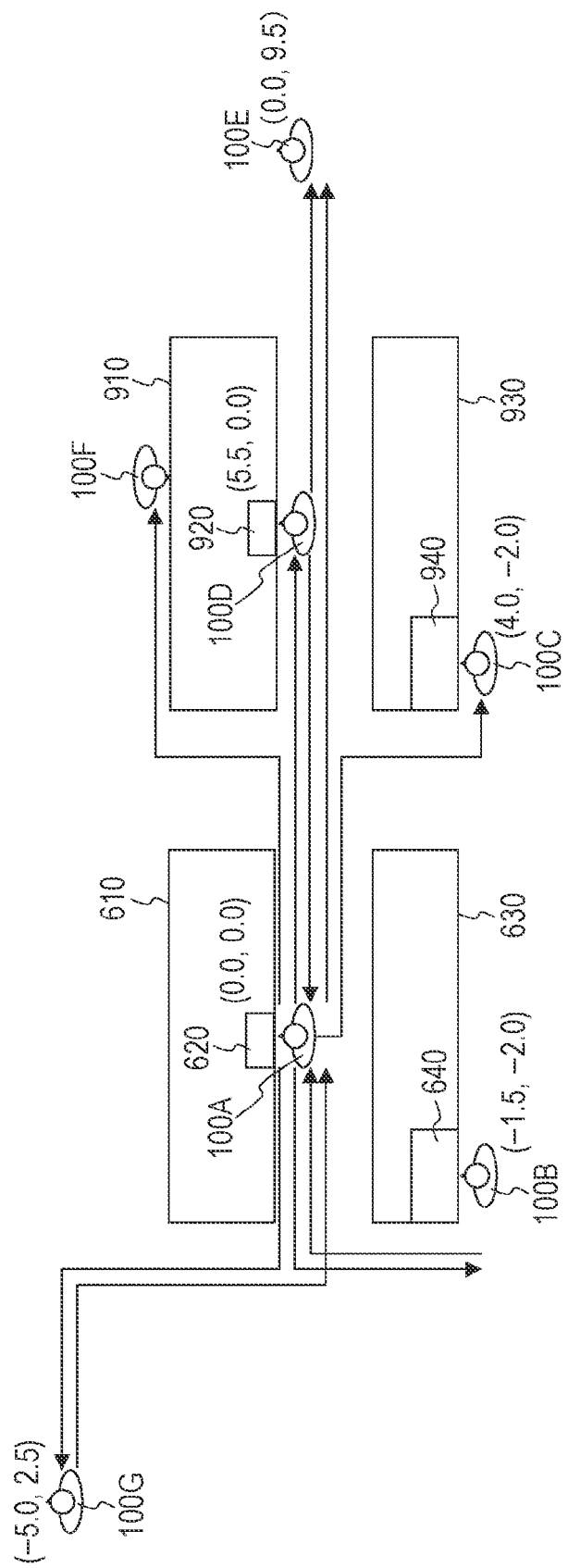

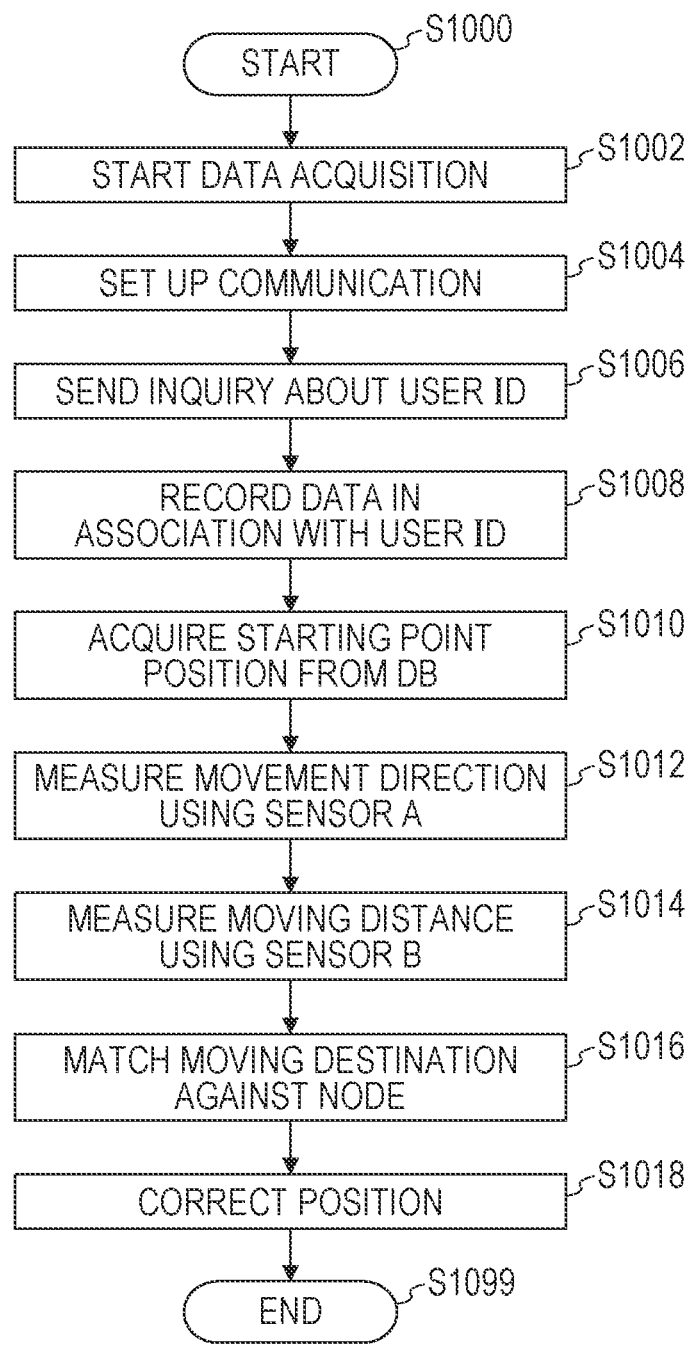

FIG. 12

| TIME | USER A | | USER B | | USER C | |
|---|---|---|---|---|---|---|
| | POSITION | ORIENTATION | POSITION | ORIENTATION | POSITION | ORIENTATION |
| 00:00:00 | (0.0, 0.0) | 0° | (−1.5, −2.0) | 0° | (0.0, −2.0) | 0° |
| 00:00:10 | (−2.2, 0.3) | 270° | (−1.5, −2.0) | 0° | (0.0, −2.0) | 0° |
| 00:00:20 | (−2.3, −2.4) | 90° | (−1.5, −2.0) | 280° | (0.0, −2.0) | 0° |

FIG. 13

| | | USER B | USER C |
|---|---|---|---|
| USER A | NUMBER OF EMAILS | 80 | 20 |
| | NUMBER OF F2Fs | 20 | 10 |
| | ORGANIZATIONAL DISTANCE | 60 | 10 |
| RELATIONSHIP DISTANCE FROM USER A | | 53 | 13 |

| TIME | USER A | | USER B | |
|---|---|---|---|---|
| | POSITION | ORIENTATION | POSITION | ORIENTATION |
| 00:00:00 | (0.0, 0.0) | 0° | (−1.5, −2.0) | 0° |
| 00:00:10 | (−2.2, 0.3) | 270° | (−1.5, −2.0) | 90° |
| 00:00:20 | (−2.5, −1.5) | 90° | (−1.5, −2.0) | 280° |
| 00:00:20 CORRECTED | (−2.5, −2.0) | 90° | (−1.5, −2.0) | 280° |

| TIME | USER A | | USER C | |
|---|---|---|---|---|
| | POSITION | ORIENTATION | POSITION | ORIENTATION |
| 00:00:00 | (0.0, 0.0) | 0° | (−1.5, 0.0) | 0° |
| 00:00:10 | (−2.5, 0.0) | 90° | (−1.5, 0.0) | 280° |
| 00:00:10 CORRECTED | (−2.0, 0.0) | 90° | (−1.5, 0.0) | 280° |

| TIME | USER C | | USER B | |
|---|---|---|---|---|
| | POSITION | ORIENTATION | POSITION | ORIENTATION |
| 00:00:00 | (−1.5, 0.0) | 0° | (−1.5, −2.0) | 0° |
| 00:00:20 | (−2.5, −1.5) | 90° | (−1.5, −2.0) | 280° |
| 00:00:20 CORRECTED | (−2.5, −2.0) | 90° | (−1.5, −2.0) | 280° |

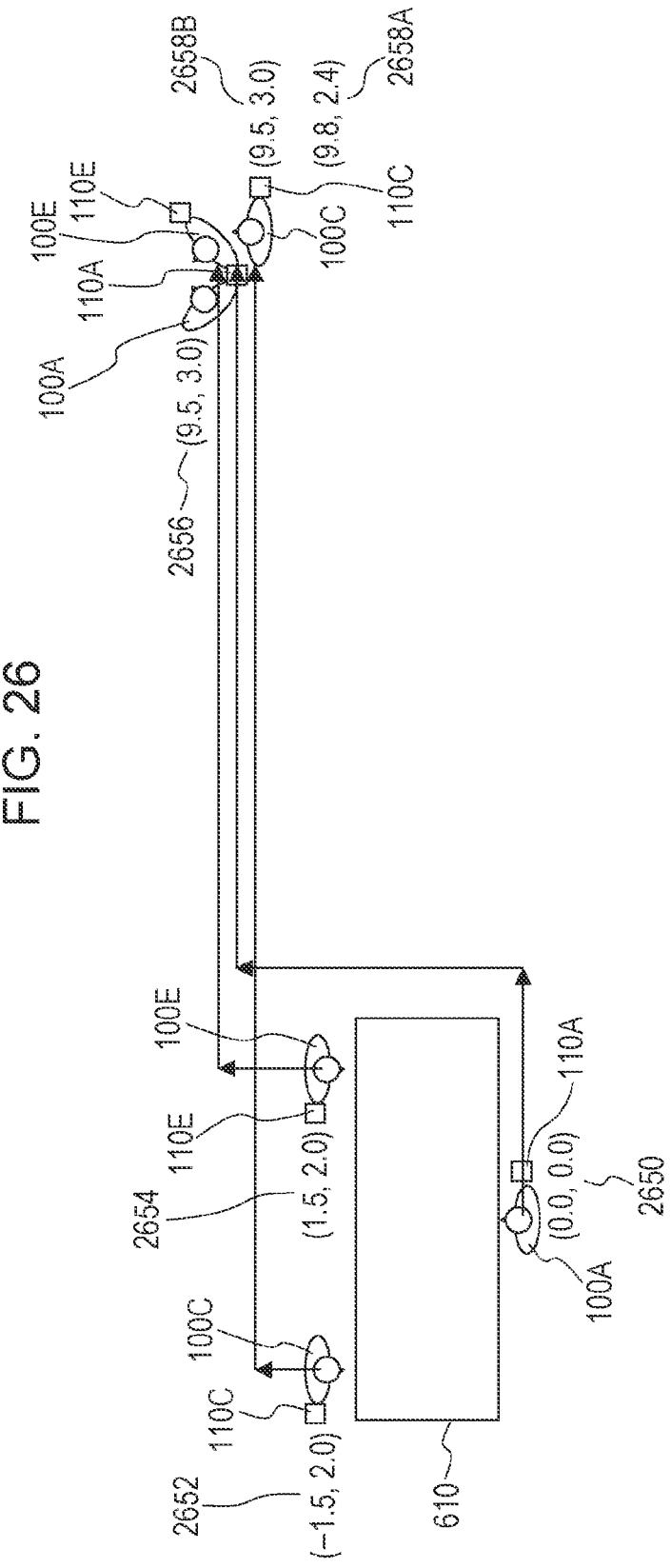

INFORMATION PROCESSING APPARATUS, INFORMATION PROCESSING METHOD, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-225304 filed Oct. 12, 2011.

BACKGROUND (i) Technical Field

The present invention relates to an information processing apparatus, an information processing method, and a computer readable medium storing a program.

(ii) Related Art

Techniques for detecting actions of a subject are available.

SUMMARY

According to an aspect of the invention, there is provided an information processing apparatus including an analysis unit, a gathering place determination unit, and a correction unit. The analysis unit analyzes an action history including at least a position of a subject, in accordance with action information obtained by detecting an action of the subject. The gathering place determination unit determines a position of a gathering place where plural subjects including the subject are together, in accordance with position information indicating the position of the subject which is included in the action information. The correction unit corrects position information about the subject, in accordance with the position of the gathering place determined by the gathering place determination unit.

BRIEF DESCRIPTION OF THE DRAWINGS

An exemplary embodiment of the present invention will be described in detail based on the following figures, wherein:

FIG. 3 illustrates an example of a process according to the exemplary embodiment;

FIG. 4 illustrates an example data structure of a sensor/user correspondence table;

FIGS. 5A to 5D illustrate examples of measurement data to be processed;

FIG. 9 illustrates an example of a process according to the exemplary embodiment;

FIG. 10 is a flowchart illustrating an example of a process according to the exemplary embodiment;

FIG. 12 illustrates an example data structure of a measurement data table;

FIG. 13 illustrates an example data structure of a relationship table;

FIG. 26 illustrates an example of a process according to the exemplary embodiment.

DETAILED DESCRIPTION

An exemplary embodiment of the present invention will be described hereinafter with reference to the drawings.

Figure 1:
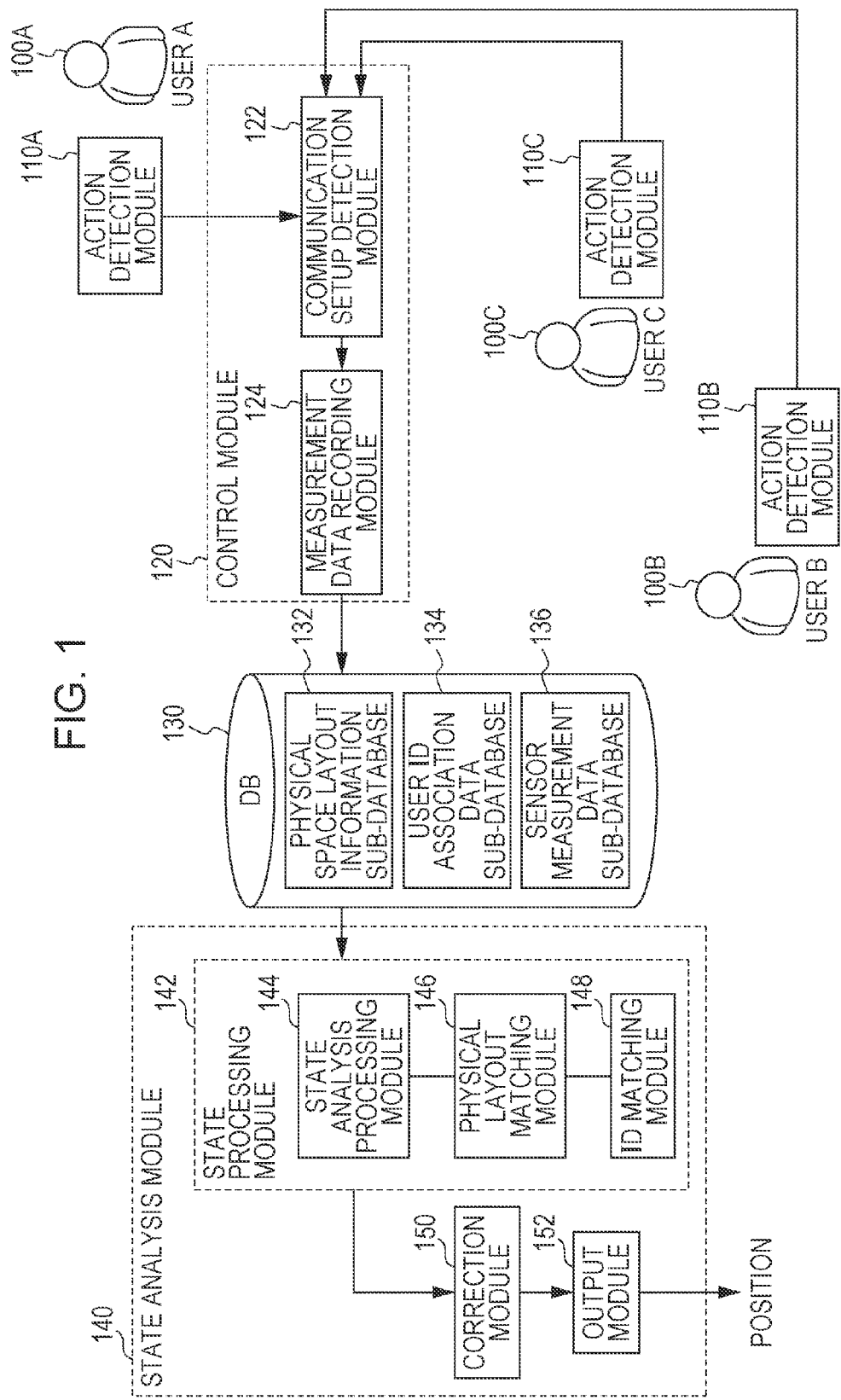
FIG. 1 is a conceptual module block diagram of an example configuration of an information processing apparatus according to an exemplary embodiment.

FIG. 1 is a conceptual module configuration diagram of an example configuration of an information processing apparatus according to the exemplary embodiment.

The term "module" generally refers to a logically separable part of software (computer program), hardware, or the like. Therefore, the term "module" as used in this exemplary embodiment refers to not only a module in a computer program but also a module in a hardware configuration. Thus, this exemplary embodiment will be described in the context of a computer program for providing functions of modules (a program for causing a computer to execute individual procedures, a program for causing a computer to function as individual units, and a program for causing a computer to realize individual functions), a system, and a method. While "storing", "being stored", and equivalent terms are used for convenience of description, such terms indicate, when the exemplary embodiment relates to a computer program, storing of the computer program in a storage device or performing of control to store the computer program in a storage device. Furthermore, modules and functions may have a one-to-one correspondence. In terms of implementation, one module may be composed of one program, plural modules may be composed of one program, or, conversely, one module may be composed of plural programs. Additionally, plural modules may be executed by a single computer, or a single module may be executed by plural computers in a distributed or parallel environment. One module may include another module. Further, hereinafter, the terms "connection" and "setting up of communication" or "communication setup" include physical connection and logical connection (such as exchanging data, issuing an instruction, and cross-reference between data items). The term "predetermined" means "determined before" the performance of a desired process, and may include "determined before" the start of a process according to the exemplary embodiment, and "determined before" the performance of a desired process even after the start of a process according to the exemplary embodiment, in accordance with the current state and condition or in accordance with the previous state and condition. The phrase "if A, then B" or words of similar meaning means that "it is determined whether or not A, and B if it is determined that A" unless the determination of whether or not A is required.

Furthermore, the term "system" or "apparatus" includes a configuration in which plural computers, hardware components, devices, or other suitable elements are connected to one another via a communication medium such as a network (including a one-to-one communication setup), and what is implemented by a single computer, hardware component, device, or suitable element. The terms "apparatus", "device", and "system" are used synonymously. It is to be understood that the term "system" does not include what is merely a social "mechanism" (social system) based on artificial rules.

Moreover, desired information is read from a storage device for each process performed by an individual module or, if plural processes are performed within a module, for each of the plural processes, and is processed. The process result is written in the storage device. Therefore, reading of information from the storage device before processing the information and writing of information to the storage device after processing the information may not necessarily be described herein. The term "storage device", as used herein, may include a hard disk, a random access memory (RAM), an external storage medium, a storage device using a communication line, and a register in a central processing unit (CPU).

The information processing apparatus according to this exemplary embodiment is configured to generate a map using action information about actions measured by an action detection module that a subject (hereinafter also referred to as a "user") carries. As illustrated in the example in FIG. 1, the information processing apparatus includes action detection modules 110A to 110C that users 100A to 100C carries, respectively, a control module 120, a database (DB) 130, and a state analysis module 140.

The user 100A (user A) carries the action detection module 110A, the user 100B (user B) carries the action detection module 110B, and the user 100C (user C) carries the action detection module 110C. The users 100A to 100C (hereinafter collectively referred to as "users 100" or individually referred to as a "user 100") are subjects according to this exemplary embodiment. In this exemplary embodiment, a map of the inside of a room (or office) where the users 100 work is generated. The map includes at least the seating positions of the users 100 and aisles.

In general, restricted or stereotyped actions are seen in the office, such as sitting, standing, walking, writing in a notebook, typing on a keyboard, and writing on a whiteboard. When a subject performs an action such as sitting, features are extracted from action information detected by the corresponding action detection module 110, and are stored in a dictionary. The dictionary storing the features of actions is created in advance. Thus, an action performed by a subject may be determined on the basis of action information detected by the corresponding action detection module 110, using pattern matching with the features in the dictionary.

The action detection modules 110A, 110B, and 110C (hereinafter collectively referred to as "action detection modules 110" or individually referred to as an "action detection module 110") are connected to a communication setup detection module 122. An action detection module 110 is carried by a user 100, and may be a sensor that detects the action of the user 100 or a communication device that communicates with an action detection module 110 that another user 100 carries. The action detection module 110 passes action information (also referred to as "measurement data") that is information detected by the action detection module 110 to the communication setup detection module 122. The action information is generally passed to the communication setup detection module 122 via wireless communication. Alternatively, the action information may be passed to the communication setup detection module 122 via wired communication, or the action information may be stored in a storage device in the action detection module 110 and read from the storage device by using the communication setup detection module 122.

The action detection module 110 may be incorporated in a mobile phone or the like, formed in a card or the like, or embedded in a wristband or the like so as to be fixedly attached to the arm of the user 100 so long as the action detection module 110 has functions of a communication device and functions of a sensor that detects the action of the user 100.

Examples of the action information include measurement data obtained by the sensor that the subject carries, and communication information obtained as a result of communication performed by the communication device that the subject carries.

Examples of the sensor include an acceleration sensor (for measuring the acceleration and the like of the subject who carries the acceleration sensor), a compass (for measuring the orientation and the like of the subject who carries the compass), and a gyroscope (for detecting the angle, angular velocity, and the like of the subject who carries the gyroscope). In the following description of this exemplary embodiment, measurement data obtained by the above three sensors is used by way of example. Examples of the measurement data include information capable of uniquely identifying the action detection module 110 according to this exemplary embodiment, such as a sensor ID, acceleration, direction, angle, and angular velocity, and the measurement date and time (the combination of one or more of year, month, day, hour, minute, second, millisecond, etc.). The information about a position included in the action information generally includes information about a relative coordinate position but does not include information about an absolute coordinate position, or may include information about an absolute coordinate position detected with low accuracy. For example, in an office, or a room, positions may be measured with low global positioning system (GPS) accuracy or the like or may be unmeasurable.

The communication device will be described in the context of a near field communication device (such as a Bluetooth (registered trademark) communication device). When a given communication device communicates with another communication device, a communication device ID (A) capable of uniquely identifying the given communication device according to this exemplary embodiment, a communication device ID (B) capable of uniquely identifying the other communication device according to this exemplary embodiment, the communication date and time, etc. may be included in the communication information.

The control module 120 includes the communication setup detection module 122 and a measurement data recording module 124. The control module 120 receives action information from the action detection module 110, and stores the received action information in the DB 130.

The communication setup detection module 122 is connected to the action detection modules 110A, 110B, and 110C, and the measurement data recording module 124. The communication setup detection module 122 determines whether or not it is possible to communicate with an action detection module 110. If it is determined that it is possible to communicate with an action detection module 110, the communication setup detection module 122 receives action information from the action detection module 110, and passes the action information to the measurement data recording module 124.

The measurement data recording module 124 is connected to the communication setup detection module 122 and the DB 130. The measurement data recording module 124 receives measurement data from the communication setup detection module 122, and stores the measurement data in a sensor measurement data sub-database 136 included in the DB 130. A user ID association data sub-database 134, which will be described below, may be searched for action information, and the action information may be stored in the sensor measurement data sub-database 136 in association with a user ID.

The DB 130 is connected to the measurement data recording module 124 and a state processing module 142. The DB 130 stores a physical space layout information sub-database 132, the user ID association data sub-database 134, and the sensor measurement data sub-database 136.

The physical space layout information sub-database 132 stores information about a device that detects an action detection module 110 or the like that a user 100 carries. Example of information about a device include a device ID capable of uniquely identifying the device, which is a fixed device, according to this exemplary embodiment, and information about the absolute coordinate position of a place where the device is located. The physical space layout information sub-database 132 stores a table or the like in which the device ID and the absolute coordinate position are stored in association with each other. Examples of the device include a flapper gate (used for entry/exit management and configured to detect an element capable of specifying a user, for example, but not limited to, an action detection module 110), and a copying machine (which is available for a user after the copying machine has read information about the action detection module 110 or the like that the user carries). The situation where the above device has detected an action detection module 110 or the like implies that the user who carries the action detection module 110 or the like is in the location of the device at the detection time. The absolute coordinates may be coordinates specified by latitude and longitude, and it is sufficient that a position specified by the device is fixed in a map generated according to this exemplary embodiment.

The physical space layout information sub-database 132 further stores a table or the like in which a device ID capable of uniquely identifying a device having an absolute coordinate position and a user ID detected by the device having the same device ID are stored in association with each other.

The user ID association data sub-database 134 stores a user ID that is information capable of uniquely identifying a user 100 according to this exemplary embodiment. For example, a sensor/user correspondence table 400 illustrated in an example in FIG. 4 may be stored. The sensor/user correspondence table 400 contains a "Sensor ID" column 410 and a "User ID" column 420. The "Sensor ID" column 410 stores a sensor ID that is information capable of uniquely indentifying an action detection module 110 according to this exemplary embodiment. The "User ID" column 420 stores a user ID of the user 100 who carries the action detection module 110 associated with the sensor ID. The use of the sensor/user correspondence table 400 allows measurement data and a user ID to be associated with each other.

The user ID association data sub-database 134 may also store, in association with a user ID, a communication device ID that is information capable of uniquely identifying the communication device in the corresponding action detection module 110 according to this exemplary embodiment. The use of the user ID association data sub-database 134 allows a communication device and a user ID to be associated with each other.

The user ID association data sub-database 134 may also store the stride length of a user 100 in association with the corresponding user ID. The use of the user ID association data sub-database 134 and the number of footsteps made by a user allows a moving distance of the user to be calculated.

The user ID association data sub-database 134 may also store an action starting point position determined by a state analysis processing module 144, which will be described below, in association with the corresponding user ID.

The sensor measurement data sub-database 136 stores the action information passed from the measurement data recording module 124. As described above, the action information includes a sensor ID, the measurement date and time, and the data measured by the sensor identified by the sensor ID. The action information may also be stored in association with a user ID. By analyzing the action information in the sensor measurement data sub-database 136, it may be possible to determine what action was performed, by who, and when.

The state analysis module 140 includes the state processing module 142, a correction module 150, and an output module 152.

The state processing module 142 is connected to the DB 130 and the correction module 150. The state processing module 142 includes the state analysis processing module 144, a physical layout matching module 146, and an ID matching module 148.

The state analysis processing module 144 is connected to the physical layout matching module 146. The state analysis processing module 144 analyzes the state of a user on the basis of the action information about the user. The state of a user includes at least the position of the user. The state analysis processing module 144 determines, as a relative coordinate position, a position that is the position of the action starting point of the user on the basis of the analyzed state. The action starting point of a subject may be a place where the subject stays longer than in any other place, for example, the seating position of the subject (also generally called the "seat"). The state analysis processing module 144 stores the position of the action starting point in the user ID association data sub-database 134 in the DB 130 in association with the corresponding user ID.

Figure 7:
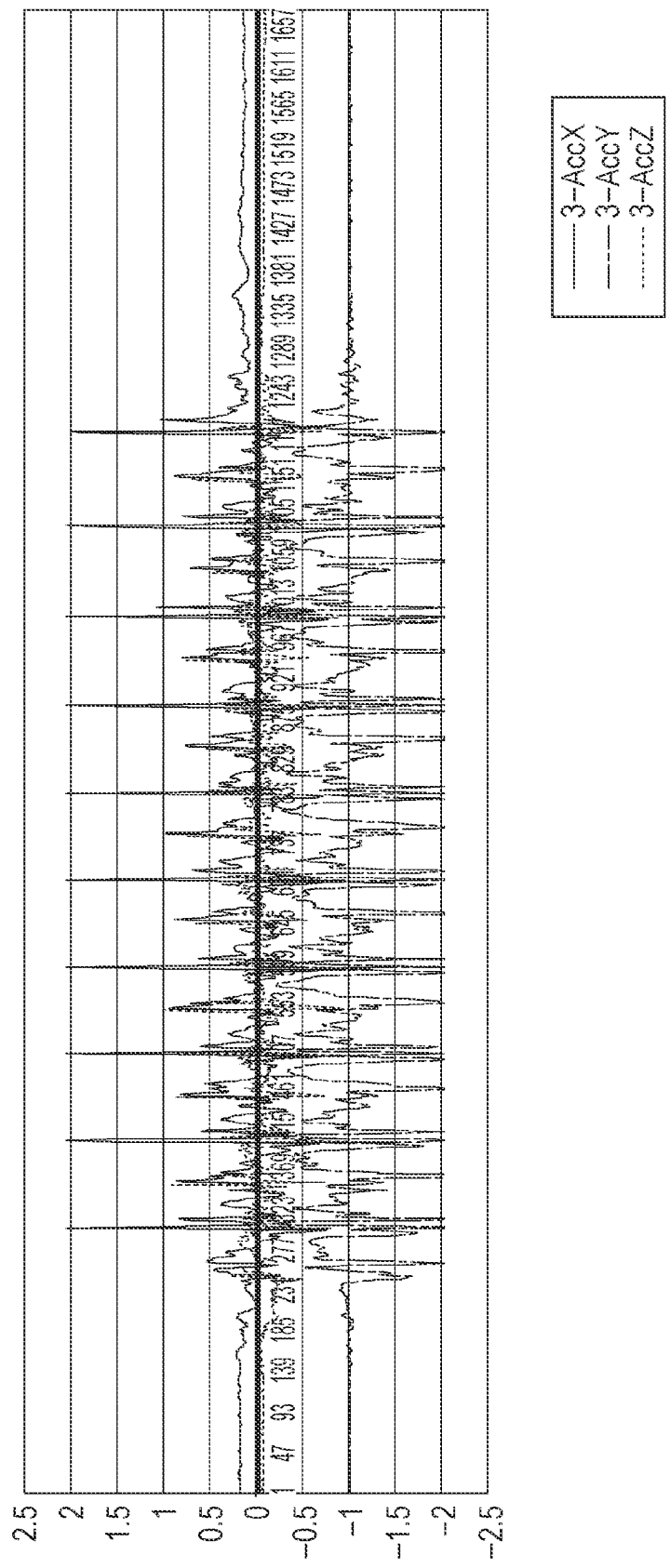
FIG. 7 illustrates an example of the count of the number of footsteps in the measurement data.
Figure 8B:
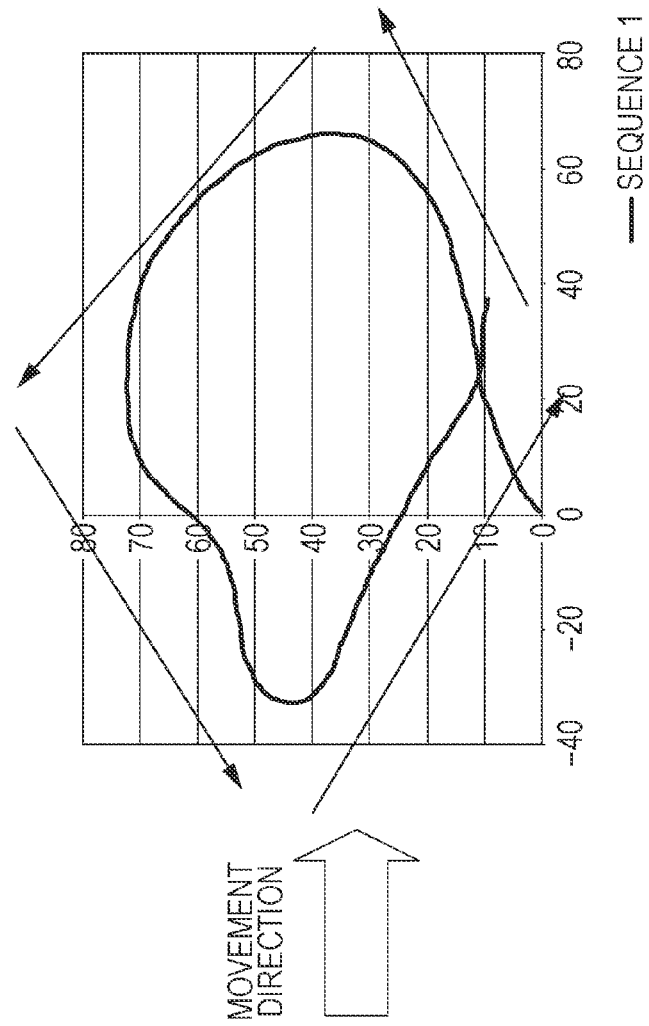
FIGS. 8A and 8B illustrate an example of a direction of measurement data.
Figure 8A:
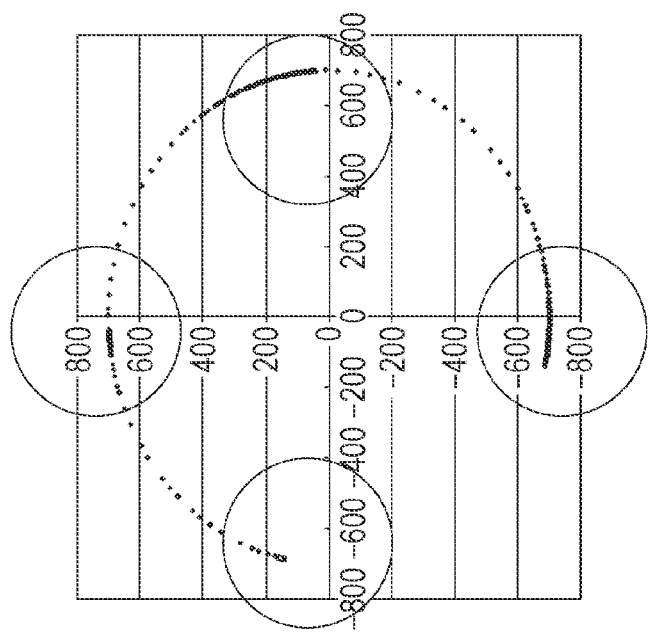

Examples of the state of a user to be analyzed include sitting, standing, walking, writing in a notebook, typing on a keyboard, and writing on a whiteboard. Results of analysis include date and time information, the direction of the user at the date and time specified by the date and time information, the number of footsteps made when the user is walking, and a walking distance or the like calculated using the number of footsteps and the stride length of the user, which is stored in, as described above, the user ID association data sub-database 134. FIGS. 5A to 5D illustrate an example of measurement data to be processed (measurement data obtained by the acceleration sensor). As described above, the state analysis is performed by extracting features from the measurement data and performing pattern matching with states in a dictionary. In the example illustrated in FIG. 5A, the measurement data may be separated into a standing period 510 and a sitting period 520 using, for example, frequency analysis. In the example illustrated in FIG. 5B, the state of writing in a notebook is obtained as a result of analysis. In the example illustrated in FIG. 5C, the state of typing on a keyboard is obtained as a result of analysis. In the example illustrated in FIG. 5D, the state of writing on a whiteboard is obtained as a result of analysis. Further, as illustrated in an example in FIG. 7, peaks in the measurement data obtained by the acceleration sensor are counted to determine the number of footsteps made by the user. The state analysis processing module 144 may extract the user ID of the user 100 who carries the action detection module 110 that has detected the measurement data, by using the sensor/user correspondence table 400, extract the stride length of the user 100 having the user ID from the user ID association data sub-database 134, and calculate a moving distance by multiplying the number of footsteps by the stride length. Furthermore, a movement path (trajectory) illustrated in an example in FIG. 8B may be calculated on the basis of the moving distance and the measurement data obtained by the compass illustrated in an example in FIG. 8A. The movement path may be an aisle in the map.

A technique for determining whether or not a given position represents an action starting point will be described. The state analysis processing module 144 determines that the position of a user who is sitting at a desk and is working (such as writing in a notebook or typing on a keyboard) for a predetermined period of time or longer represents an action starting point. The determination may be based on the condition that the user is sitting for a predetermined period of time or longer or on the conditions that the user is sitting at a desk and is working for a predetermined period of time or longer. The action starting point position is presented using the relative coordinates, and may be, for example, the coordinate starting point (0, 0) of the user 100.

The action information further includes communication information indicating that the communication devices in the action detection modules 110 owned by subjects have communicated with each other. The state analysis processing module 144 may extract a combination of subjects who have communicated with each other, in accordance with the communication information in the action information. That is, the state analysis processing module 144 may specify the communication device IDs (A) and (B) of the communication devices that have communicated with each other, and extract the user IDs of the users who carry the communication devices having the communication device IDs (A) and (B), by using the user ID association data sub-database 134. The state analysis processing module 144 then determines that the user having the user ID associated with the communication device ID (B) extracted at the communication device having the communication device ID (A) and the user having the user ID associated with the communication device ID (A) extracted at the communication device having the communication device ID (B) are getting together. Specifically, the state analysis processing module 144 determines that one of the users having the above user IDs is getting together with the other user when the user ID of the other user is extracted. The extraction of a combination of subjects may be based on the condition that communication between the subjects lasts for a predetermined period of time or longer.

The action information further includes direction information and position information indicating the direction and position of the subject, respectively. The state analysis processing module 144 may extract a combination of subjects that have communicated with each other, in accordance with the direction information and position information in the action information. That is, the state analysis processing module 144 may specify the sensor IDs of plural action detection modules 110 that have detected the information and position information, and extract the user IDs of the users who carry the action detection modules 110 having the sensor IDs, by using the user ID association data sub-database 134. The state analysis processing module 144 then determines that the users having the extracted user IDs are in communication with each other. Specifically, when user IDs are extracted, the state analysis processing module 144 determines that users having the extracted user IDs are in communication with each other. The extraction of a combination of subjects who are in communication with each other may be based on the condition that communication between the subjects has been successfully achieved for a predetermined period of time or longer.

The state analysis processing module 144 may also extract a combination of subjects who are getting together, on the basis of the direction information and position information in the action information without using information about communication between communication devices. That is, the state analysis processing module 144 may specify the sensor IDs of plural action detection modules 110 that have detected the direction information and position information, and extract the user IDs of the users who carry the action detection modules 110 having the sensor IDs, by using the user ID association data sub-database 134. The state analysis processing module 144 then determines that the users having the extracted user IDs are getting together. Specifically, when user IDs are extracted, the state analysis processing module 144 determines that users having the extracted user IDs are getting together. The extraction of a combination of subjects may be based on the condition that the subjects are getting together for a predetermined period of time or longer.

When plural users move synchronously within a predetermined range, the state analysis processing module 144 may analyze the state of movement of the plural users with the predetermined stride lengths the plural users being corrected to match. The term "moving synchronously", as used herein, refers to walking together. The determination of whether or not users move synchronously will be described below with reference to FIGS. 24, 25A, and 25B. The predetermined stride lengths are stored in the user ID association data sub-database 134 in the DB 130. The analyzing of the state of movement of a user implies the calculating of a moving distance of a user based on the corrected stride length and the number of footsteps made by the user.

The physical layout matching module 146 is connected to the state analysis processing module 144 and the ID matching module 148. The physical layout matching module 146 has a function of converting the relative coordinate position of the action starting point determined by the state analysis processing module 144 into an absolute coordinate position. The physical layout matching module 146 may execute the function of performing conversion from a relative coordinate position to an absolute coordinate position, in response to an action of a given user or any other user, when a device having an absolute coordinate position detects the given user or any other user.

For example, if a target user 100 has passed a flapper gate, the relative coordinate position of the action starting point of the user 100 is converted into an absolute coordinate position on the basis of the moving distance from when the user 100 passed the flapper gate, the direction of the flapper gate when viewed from the user 100, and the absolute coordinate position of the flapper gate.

The physical layout matching module 146 may also change the relative coordinate position of the action starting point of a target user into an absolute coordinate position, on the basis of a combination of users extracted by the state analysis processing module 144, using the absolute coordinate position of the action starting point of another user. For example, if another user has passed the flapper gate, the position of the flapper gate may be used as the absolute coordinate position of the action starting point of the other user. The absolute coordinate position of the action starting point of the target user may be calculated from the absolute coordinate position of the action starting point of the other user and the position of the place where the target user and the other user get together.

The physical layout matching module 146 may extract a combination of users on the basis of relationship information indicating a relationship between users. The relationship information will be described below using a relationship table 1300 illustrated in an example in FIG. 13.

The physical layout matching module 146 may also generate a map in which the position of a desk is the position of an action starting point of a user and an aisle is a path along which the user has moved.

The ID matching module 148 is connected to the physical layout matching module 146. The ID matching module 148 extracts information corresponding to identification information identifying a target user from the user ID association data sub-database 134. That is, the ID matching module 148 performs an extraction process in response to a request from the state analysis processing module 144 and the physical layout matching module 146, and passes a result to the requesting state analysis processing module 144 and the physical layout matching module 146. Examples of the information to be extracted include a user ID associated with a sensor ID, a user ID associated with a communication device ID, and a stride length of a user having a user ID.

The correction module 150 is connected to the state processing module 142 and the output module 152. The correction module 150 corrects the position of the action starting point of each user, a map, or the like, which is generated by the physical layout matching module 146. In an office where a large number of electronic devices such as personal computers are installed, the accuracy of a sensor such as a compass may be reduced. Therefore, for example, the correction module 150 generates plural positions of the action starting points of each user, plural maps, or the like, using action information about plural users and action information about actions of each user within multiple days, and corrects the generated results using their statistical value, such as an average value, a mode value, or a central value.

The correction module 150 determines the position of a gathering place where plural users are together on the basis of the state analyzed by the state analysis processing module 144 and the direction information or position information about the users which is included in the action information. Further, the correction module 150 corrects the position information about a user on the basis of the position of the gathering place. The gathering place is included in a location where users may stop, which will be described below. The correction module 150 recognizes a gathering place on the basis of the condition that the positions of two or more users are currently within a predetermined distance or on the basis of the condition that two or more users face each other. The position of the gathering place may be the absolute coordinate position or the relative coordinate position. The gathering place may also become an action starting point.

The correction module 150 may further correct position information about a user on the basis of the position of the action starting point of another user, which is determined by the state analysis processing module 144. The reason for this is that an action starting point is likely to be a gathering place.

In addition, if another user has moved to a gathering place where users are together, the correction module 150 may correct the position of the other user who has moved to the gathering place, on the basis of direction information about the users who are together and direction information about the other user or on the basis of relationship information that is information indicating a relationship between the users who are together and the other user.

The output module 152 is connected to the correction module 150. The output module 152 outputs the position of the action starting point of the individual user, the map, or the like, which has been corrected by the correction module 150. For example, the output module 152 may perform operations such as printing a map using a printer, displaying a map on a display device such as a display, passing a map to an information processing apparatus such as a map database, and storing a map in a storage medium such as a memory card.

Figure 2:
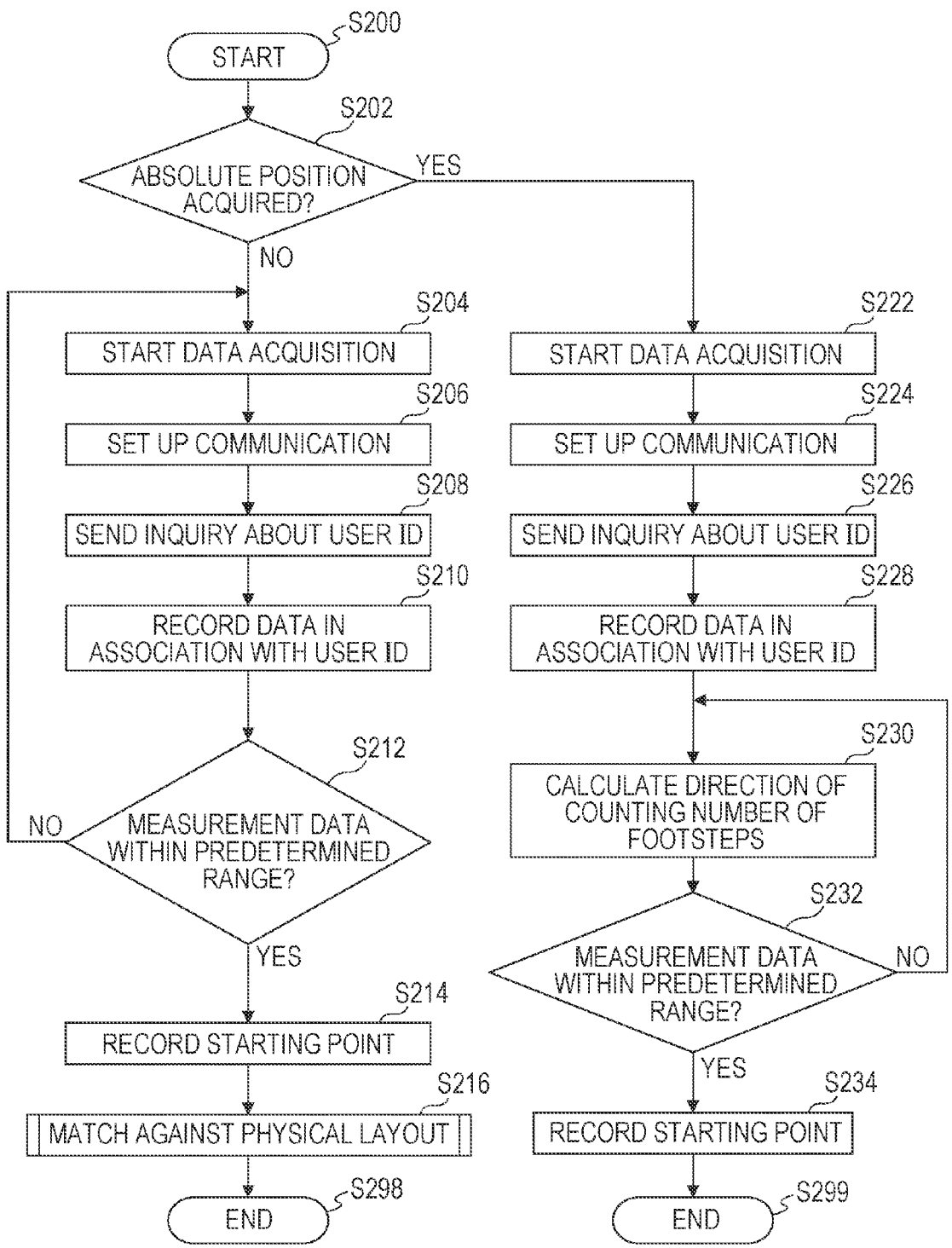
FIG. 2 is a flowchart illustrating an example of a process according to the exemplary embodiment.
Figure 5B:
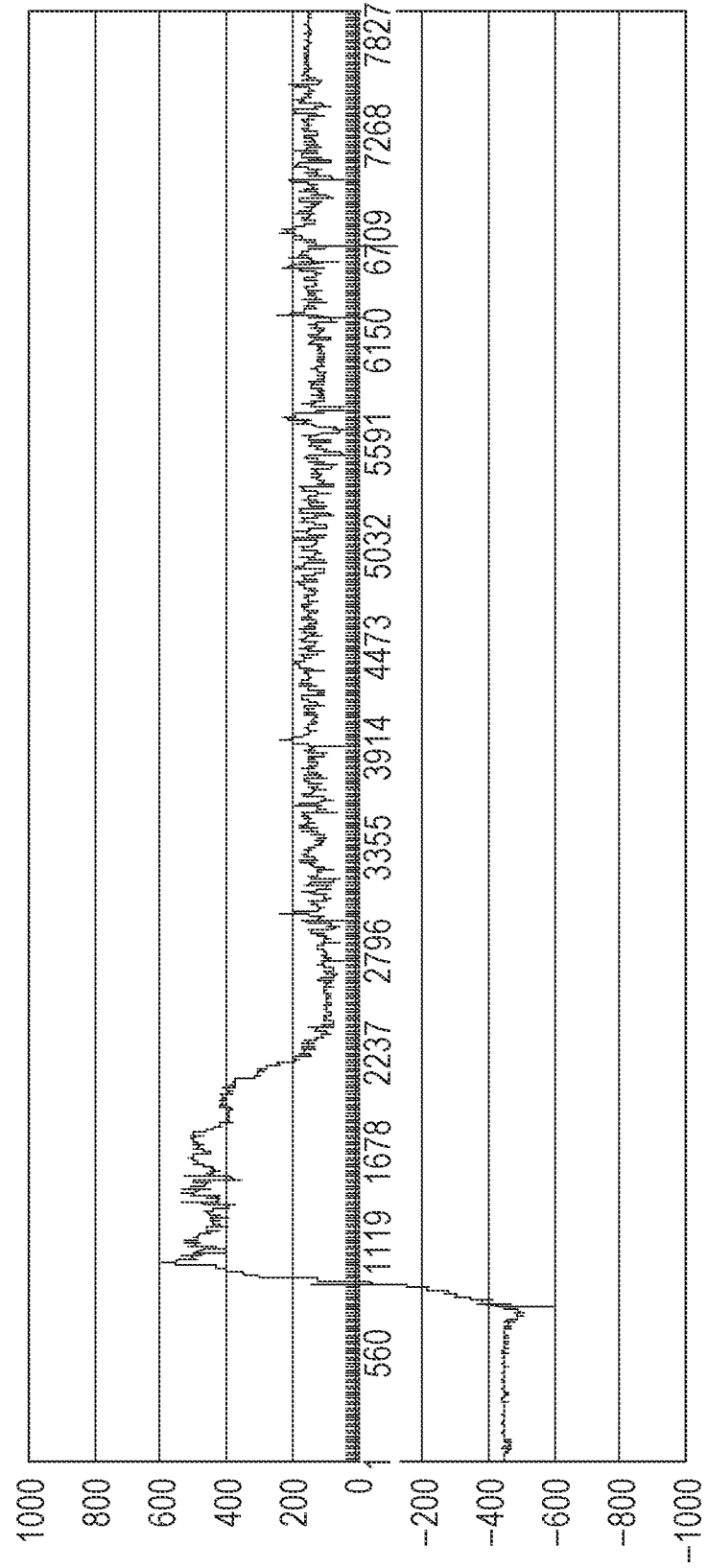
Figure 5D:
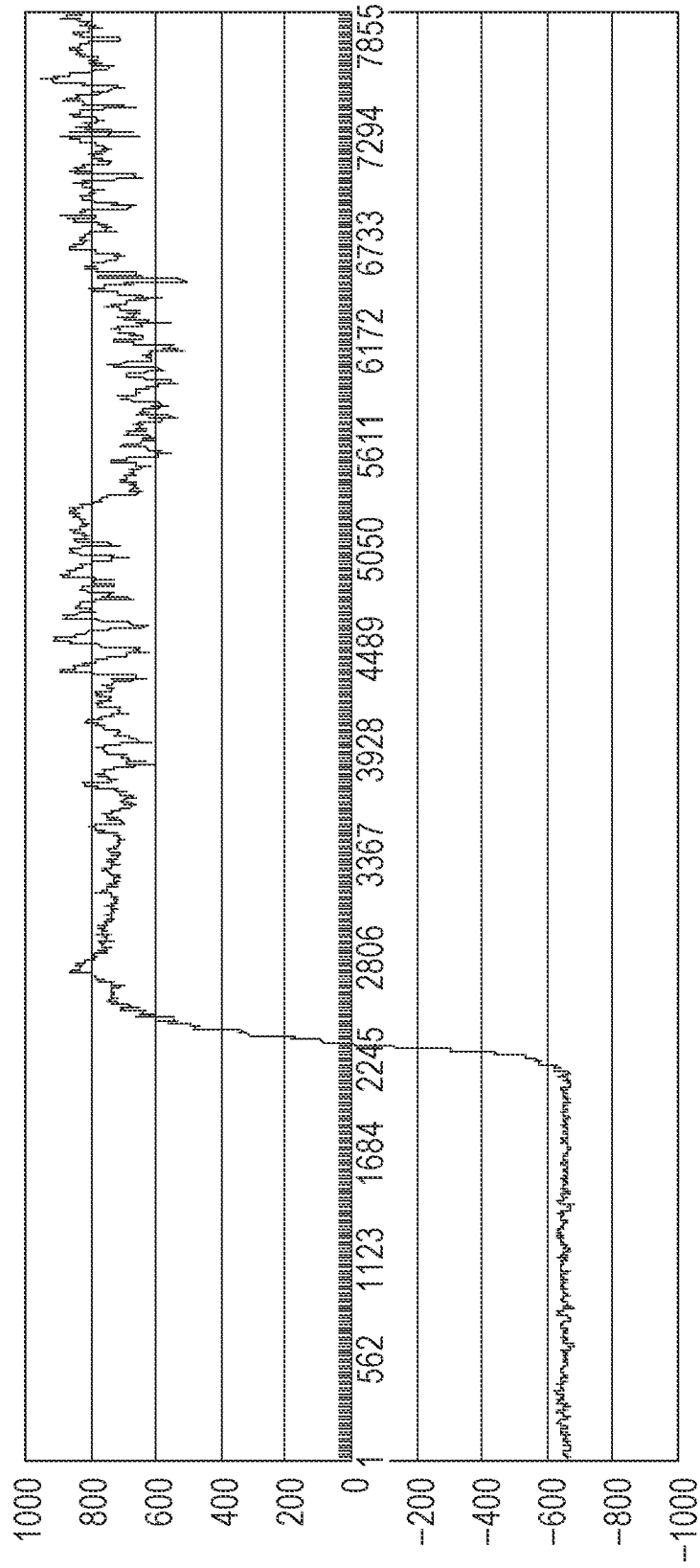

FIG. 2 is a flowchart illustrating an example of a process according to this exemplary embodiment.

In step S202, the state analysis processing module 144 determines whether or not the absolute coordinate position (hereinafter also referred to as the "absolute position") of a target user has been acquired. If the absolute position of the target user has been acquired, the process proceeds to step S222, and the process proceeds to step S204 otherwise. For example, if the target user has passed the flapper gate described above, the process proceeds to step S222. The state analysis processing module 144 searches the physical space layout information sub-database 132 to determine whether or not the absolute position of the target user has been acquired.

In step S204, the action detection module 110 starts data acquisition. For example, each sensor in the action detection module 110 detects the action of the user.

In step S206, the communication setup detection module 122 sets up communication with the action detection module 110.

In step S208, the measurement data recording module 124 sends an inquiry about the user ID. That is, the user ID association data sub-database 134 is searched for the user ID using the sensor ID, and the user ID is extracted.

In step S210, the measurement data recording module 124 records measurement data in the sensor measurement data sub-database 136 in association with the user ID.

In step S212, the state analysis processing module 144 determines whether or not the measurement data is within a predetermined range. If the measurement data is within the range, the process proceeds to step S214, and the process is performed from step S204 otherwise.

In step S214, the state analysis processing module 144 records the action starting point of the target user. Here, the position of the action starting point is represented using the relative coordinates.

In step S216, the physical layout matching module 146 performs matching against a physical layout. This matching process will be described below with reference to FIG. 10 and other figures.

In step S222, the action detection module 110 starts data acquisition. For example, each sensor in the action detection module 110 detects the action of the user.

In step S224, the communication setup detection module 122 sets up communication with the action detection module 110.

In step S226, the measurement data recording module 124 sends an inquiry about the user ID. That is, the user ID association data sub-database 134 is searched for the user ID using the sensor ID, and the user ID is extracted.

In step S228, the measurement data recording module 124 records measurement data in the sensor measurement data sub-database 136 in association with the user ID.

In step S230, the state analysis processing module 144 counts the number of footsteps made by the user, and calculates the direction. That is, the moving distance from and the direction with respect to the absolute position determined in step S202 are calculated.

In step S232, the state analysis processing module 144 determines whether or not the measurement data is within a predetermined range. If the measurement data is within the range, the process proceeds to step S234, and the process is performed from step S230 otherwise.

In step S234, the state analysis processing module 144 records the action starting point of the target user. Here, the position of the action starting point is represented using the absolute coordinates.

Through the above process, a user having an action starting point represented in the absolute coordinates and a user having an action starting point represented in the relative coordinates may be concurrently present.

The predetermined range used in the determination in steps S212 and S232 may be, as described below, a range obtained when the user is sitting at a desk and is working for a predetermined period of time or longer.

FIG. 3 illustrates an example of a process according to this exemplary embodiment.

In the example illustrated in FIG. 3, the user 100A having the action detection module 110A is sitting at a desk 320 in a block 310 in an office, and the block 310 includes plural desks. While, in the example illustrated in FIG. 1, action information is sent from the action detection module 110A and is stored in the DB 130 via the control module 120, the control module 120 is not illustrated in FIG. 3.

The action detection module 110A detects the action of the user 100A, and starts the acquisition of action information. Then, the action detection module 110A matches the sensor IDs associated with the action detection modules 110 that are in communication with the DB 130 (control module 120) against user IDs, and specifies the user A (the user 100A). For example, a user ID may be extracted from the sensor ID of the action detection module 110A by using the sensor/user correspondence table 400, illustrated in the example in FIG. 4, in the user ID association data sub-database 134.

Then, the state analysis processing module 144 in the state analysis module 140 determines, using the measurement data obtained by the acceleration sensor, whether or not the target user is sitting. As described above, in the example illustrated in FIG. 5A, the state analysis processing module 144 separates the measurement data into the standing period 510 and the sitting period 520.

Then, the state analysis processing module 144 performs frequency analysis on the measurement data obtained by the acceleration sensor, and determines whether the user is sitting at a desk and is working or is in a meeting. As described above, in the examples illustrated in FIGS. 5B and 5C, it is determined that the user is sitting at a desk and is working. In the example illustrated in FIG. 5D, it is determined that the user is in a meeting.

If the user is sitting at a desk for a predetermined period of time or longer and is working, the state analysis processing module 144 determines that the user is working in the office (or room), and sets the desk as the action starting point (the seat).

Figure 6:
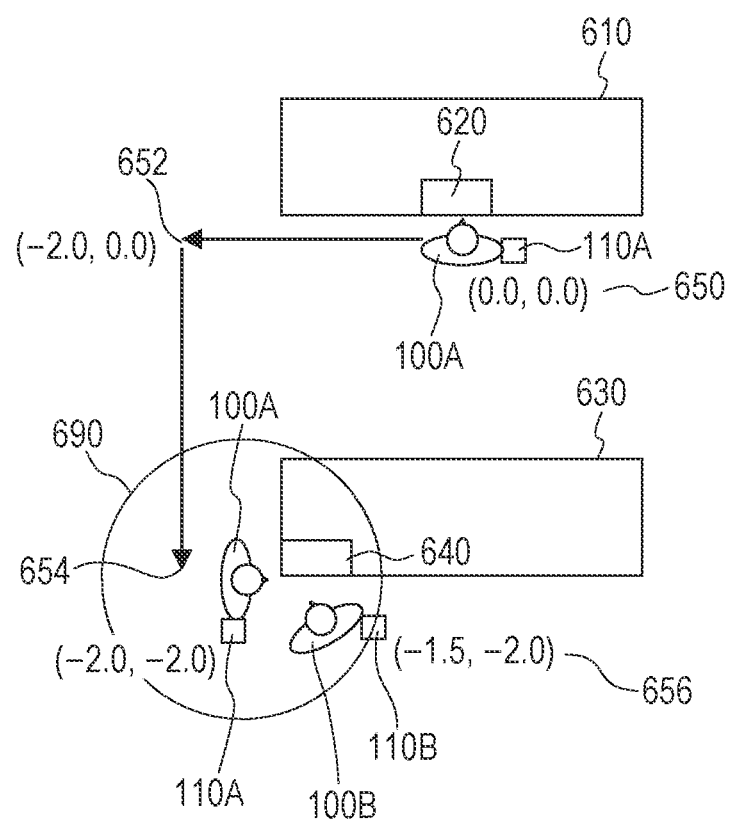
FIG. 6 illustrates an example of a process according to the exemplary embodiment.

FIG. 6 illustrates an example of a process according to this exemplary embodiment. In the illustrated example, a location where users may stop (including the gathering place described above; hereinafter also referred to as a "node") is registered.

The seat (desk 620) of the user A (user 100A) and the seat (desk 640) of the user B (user 100B) are registered as action starting points through the process described above. That is, the action starting point of the user A (100A) is at a position 650, and the action starting point of the user B (100B) is at a position 656.

If the user A (100A) has moved to the desk 640 of the user B (100B), the moving destination (for example, a position adjacent to the desk 640) of the user A (100A) may be determined by counting the number of footsteps made by the user A (100A) using acceleration data (see an example illustrated in FIG. 7) and by calculating the movement direction of the user A (100A) using the compass (see an example illustrated in FIG. 8).

In the office, however, the accuracy of a compass serving as a sensor may be reduced, a change in stride length between a wide corridor and a space between chairs may occur, and other undesirable or unexpected results may occur. For example, in the example illustrated in FIG. 6, the user A (100A) may be determined by mistake to be at a position 654 although the user A (100A) is actually at a position (−2.0, −2.0) adjacent to the desk 640. In the example illustrated in FIG. 6, the observed position 654 is located at an upper left position with respect to the position (−2.0, −2.0).

Therefore, when the user A (100A) is located near the desk 640 (specifically, when the desk 640 is within a correction target range 690 centered at the position of the user A (100A)), it is determined that the user A (100A) and the user B (100B) are "getting together (and talking)" from the orientation of the user A (100A) (the current measurement data obtained by the compass in the action detection module 110A), the orientation of the user B (100B) (the current measurement data obtained by the compass in the action detection module 110B), and the staying time (a period of time during which it is determined that the user A (100A) stops (the user A (100A) is standing with the number of footsteps being 0)). Then, the relative position of the action starting point of each of the user A (100A) and the user B (100B) is specified using an average value, a mode value, a central value, or any other suitable value of a history of comings and goings of each of the user A (100A) and the user B (100B). The determination of the user A (100A) and the user B (100B) being "getting together (and talking)" may be based on the condition that the communication devices in the action detection modules 110A and 110B are communicating with each other.

It is to be understood that not only measurement data between two users but also measurement data among three or more users may be analyzed. FIG. 9 illustrates an example of a process according to this exemplary embodiment. A user A (100A) may get together with a user B (100B), a user C (100C), and a user D (100D) at their own seats, and a user G (100G) may get together with a user F (100F) at the seat of the user F (100F) and get together with a user E (100E). Accordingly, measurement data is accumulated, and a map of the entire office is created. That is, the state analysis module 140 determines that a desk is located at the position of the action starting point of each user and that the desk is associated with the seat of the user. The state analysis module 140 further determines that the paths along which the individual users have moved (indicated by arrowed lines in the example illustrated in FIG. 9) are aisles, and creates a map.

In addition, even if the user A (100A) has not moved directly to the seat of the user F (100F), the user G (100G) has moved to the seat of the user F (100F) through the seat of the user A (100A), and therefore the relative coordinate position of the user F (100F) with respect to the action starting point of the user A (100A) may be specified from the action history (measurement data) of the user G (100G). That is, if the user A (100A) has not moved to the action starting point of the user F (100F) from the action starting point of the user A (100A), a path along which another user has moved to the action starting point of the user F (100F) through the action starting point of the user A (100A) may be extracted, and a positional relationship in the relative coordinates between the action starting point of the user A (100A) and the action starting point of the user F (100F) may be determined using the extracted path.

FIG. 10 is a flowchart illustrating an example of a process according to this exemplary embodiment.

In step S1002, the action detection module 110 starts data acquisition. For example, each sensor in the action detection module 110 detects the action of the user.

In step S1004, the communication setup detection module 122 sets up communication with the action detection module 110.

In step S1006, the measurement data recording module 124 sends an inquiry about the user ID. That is, the user ID association data sub-database 134 is searched for the user ID using the sensor ID, and the user ID is extracted.

In step S1008, the measurement data recording module 124 records measurement data in the sensor measurement data sub-database 136 in association with the user ID.

In step S1010, the physical layout matching module 146 acquires the action starting point position corresponding to the user ID of the target user from the user ID association data sub-database 134 in the DB 130.

In step S1012, the physical layout matching module 146 measures a movement direction using the measurement data obtained by the sensor A.

In step S1014, the physical layout matching module 146 measures a moving distance using the measurement data obtained by the sensor B.

In step S1016, the physical layout matching module 146 matches the moving destination against a node. The term "node", as used herein, refers to, as described above with reference to FIG. 6, a location where users may stop, and may be, as described above, a position determined using an average value, a mode value, a central value, or any other suitable value of a history of comings and goings. The term "matching", as used herein, refers to extracting of a node within a predetermined distance from the position of the moving destination. The node may be at the position of a device having an absolute coordinate position, such as a flapper gate.

In step S1018, the physical layout matching module 146 corrects the position of the moving destination using the position of the node. For example, the position of the moving destination may be changed to the position of the node, or the position of the moving destination may be shifted to the position of the node in accordance with a predetermined weight. If the node is at the position of a device having an absolute coordinate position, the physical layout matching module 146 changes the relative coordinate position to the absolute coordinate position. That is, the relative coordinate position of the moving destination is changed to the absolute coordinate position of the device. The difference between the previously generated relative coordinate position and the relative coordinate position of the moving destination may be added to or subtracted from the absolute coordinate position of the moving destination. A correction operation described below using examples illustrated in FIGS. 11, 12, and 13 may be used.

Figure 11:
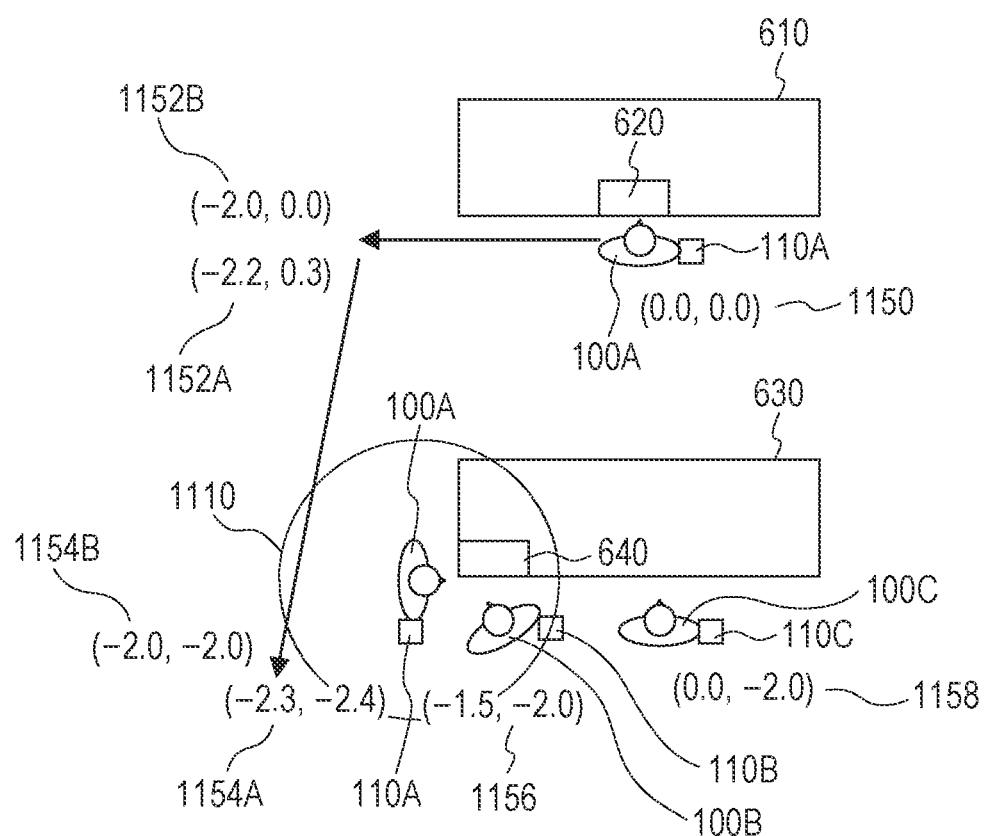
FIG. 11 illustrates an example of a process according to the exemplary embodiment.

FIG. 11 illustrates an example of a process according to this exemplary embodiment. It is assumed that a user A (100A) has moved from a position 1150 to a measured position 1154A through a measured position 1152A to see a user B (100B). A user C (100C) is adjacent to the user B (100B).

If the correction module 150 determines that, as in the example illustrated in FIG. 6, the user A (100A) and the user B (100B) are "getting together (and talking)" (or are in a gathering place), the correction module 150 determines that the user A (100A) and the user B (100B) are within a normal conversation distance (50 cm to 100 cm), and corrects the position of the user A (100A).

For example, in the example illustrated in FIG. 11, the measured position 1154A of the moving destination of the user A (100A) is (−2.3, −2.4) from the measurement data. In this case, since the action starting point of the user B (100B) is at a position 1156 (−1.5, −2.0), the correction module 150 may correct the current position of the user A (100A) from the measured position 1154A (−2.3, −2.4) of the user A (100A) to a corrected position 1154B (−2.0, −2.0) on the basis of the position of the gathering place (the position 1156 that represents the action starting point of the user B (100B)). Specifically, the correction module 150 performs correction on the basis of a measurement data table 1200 (FIG. 12) that is action information. At 00:00:20, which is specified in a "Time" column 1210, the distance between the user A (100A) and the user B (100B) is within a predetermined range. The predetermined range may be within 1.0 for both the x coordinate and the y coordinate. That is, $$(-2.3,-2.4)-(-1.5,-2.0)<=(1.0,1.0).$$

Therefore, the user A (100A) and the user B (100B) satisfy the condition regarding position information. In contrast, the user A (100A) and the user C (100C) do not satisfy the condition regarding position information. Accordingly, the user A (100A) and the user B (100B) are in a gathering place, and the correction module 150 corrects the measured position 1154A of the user A (100A). The correction module 150 adds −0.5 to the value in the x coordinate of the position 1156 (−1.5, −2.0), which is the action starting point of the user B (100B), on the basis of either of or both the current directions of the user A (100A) and the user B (100B) to correct the measured position 1154A (−2.3, −2.4) to the corrected position 1154B (−2.0, −2.0). More specifically, since the direction of the user A (100A) is right (90°), only the value in the x coordinate is corrected so as to be away by a conversation distance (a predetermined value of, for example, 50 cm). While the correction module 150 performs correction using the position of the action starting point of the user B (100B), the current position (measurement data) of the user B (100B) may be used instead.

In addition, the correction module 150 may perform correction while confirming that the distance between the position obtained before correction and the position obtained after correction is within a predetermined value. Specifically, the correction module 150 may perform correction if the distance between the measured position 1154A (−2.3, −2.4), which is the position of the user A (100A) obtained before correction, and the corrected position 1154B (−2.0, −2.0), which is the position of the user A (100A) obtained after correction, is within a correction range 1110 (within a predetermined value of, for example, 0.5), and may not perform correction otherwise.

In addition, the correction module 150 may perform correction to correct the positions of the user A (100A) obtained before and after the correction. For example, the correction module 150 corrects the measured position 1154A of the user A (100A) to the corrected position 1154B, and corrects the measured position 1152A obtained at the preceding time (00:00:10, which is specified in the "Time" column 1210 of the measurement data table 1200) to a corrected position 1152B. In this correction performed by the correction module 150, the correction module 150 corrects the measured position 1152A to the corrected position 1152B (−2.0, 0.0), which is linearly shifted from the corrected position 1154B (−2.0, −2.0). In this correction performed by the correction module 150, the correction module 150 determines whether or not the preceding time (i.e., 00:00:00, which is specified in the "Time" column 1210 of the measurement data table 1200) is an action starting point. If the preceding time is an action starting point, the correction module 150 may perform correction also using the position of the action starting point. For example, correction to a position which is linearly shifted from the action starting point may be performed.

In addition, in a case where the user A (100A) stops at a position that is near the action starting point of the user B (100B) and that is also near the action starting point of the user C (100C), it is determined that the user A (100A) is near the action starting point of the user B (100B) if it is determined that the user A (100A) has a stronger relationship with the user B (100B), by using the relationship table 1300 indicating relationships among the user A (100A), the user B (100B), and the user C (100C). Then, the position of the moving destination of the user A (100A) is corrected. A correction operation similar to that described above may be performed.

FIG. 13 illustrates an example data structure of the relationship table 1300. The relationship table 1300 includes a "User A" column 1310 and a "Relationship Distance from User A" column 1320 in the row direction, and a "User B" column 1340 and a "User C" column 1350 in the column direction.

The "User A" column 1310 includes a "Number of Emails" column 1312, a "Number of F2Fs" column 1314, and an "Organizational Distance" column 1316. The "Number of Emails" column 1312 stores the number of emails exchanged between the user A and another user (user B, user C), and the "Number of F2Fs" column 1314 stores the number of times the user A has interacted face to face with another user (user B, user C). The "Organizational Distance" column 1316 stores an organizational distance between the user A and another user (user B, user C) (for example, a value obtained by multiplying the reciprocal of the number of paths between the user A and another user in a tree structure indicating an organizational chart by 100). The "Relationship Distance from User A" column 1320 stores an average value of the values stored in the "Number of Emails" column 1312, the "Number of F2Fs" column 1314, and the Organizational Distance" column 1316. Here, the state analysis module 140 determines that the larger the value, the stronger the relationship. If the value stored in the "Relationship Distance from User A" column 1320 is greater than or equal to a predetermined value and if the positions of the user A (100A) and the user B (100B) are within a predetermined distance, the state analysis module 140 determines that the user A (100A) and the user B (100B) are getting together. Since the value in the "Relationship Distance from User A" column 1320 between the user A (100A) and the user C (100C) is not greater than or equal to the predetermined value, the state analysis module 140 determines that the user A (100A) and the user C (100C) are not getting together.

Figure 14:
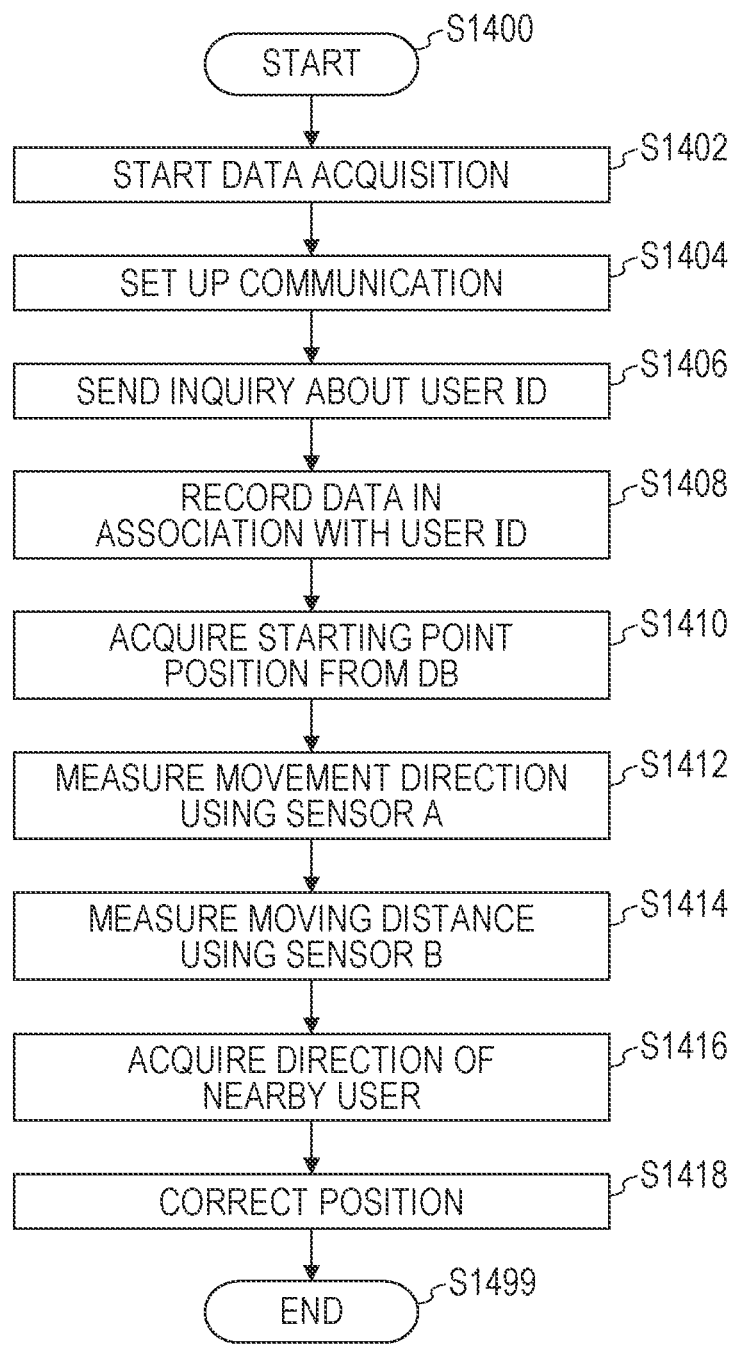
FIG. 14 is a flowchart illustrating an example of a process according to the exemplary embodiment.

FIG. 14 is a flowchart illustrating an example of a process according to this exemplary embodiment.

The processing of steps S1402 to S1414 is similar to the processing of steps S1002 to S1014 in the flowchart illustrated in the example in FIG. 10, respectively.

In step S1416, the correction module 150 acquires the direction of a user who is near the moving destination. The term "near the moving destination", as used herein, means within a predetermined range from the position (actual measured value) of the moving destination.

In step S1418, the correction module 150 corrects the position of the moving destination. If plural users are present, the correction operation described above using the examples illustrated in FIGS. 11 and 12 is performed from the relationship between the direction of a user who has moved and the direction of another user. That is, the correction module 150 extracts a user to which the user who has moved is expected to talk from the relationship between the direction of the user who has moved and the direction of another user, and determines the position of the action starting point of the extracted use as a gathering place. Then, the correction module 150 corrects the position of the target user from the position of the gathering place. The correction module 150 may perform correction similar to the correction previously performed for another user.

Figure 15:
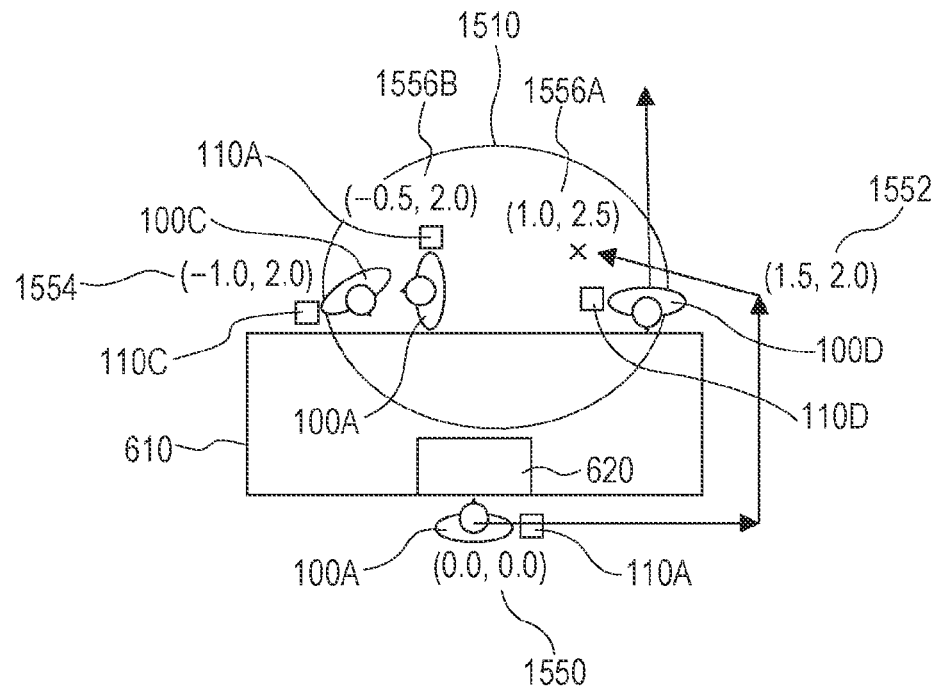
FIG. 15 illustrates an example of a process according to the exemplary embodiment.

FIG. 15 illustrates an example of a process according to this exemplary embodiment. It is assumed that a user A (100A) has moved from a position 1550 to talk to a user C (100C) at a position 1554. In this case, because of the low positioning accuracy of a sensor, the user A (100A) is incorrectly determined to be at a measured position 1556A, which is closer to a user D (100D). That is, a gathering place defined by the positions of the user A (100A) and the user D (100D) is obtained with the use of only position information. Therefore, a gathering place is determined using direction information about the user A (100A), the user C (100C), and the user D (100D). The determination of a gathering place using direction information will be described below with reference to FIGS. 16 to 19. In the example illustrated in FIG. 15, the user A (100A) and the user C (100C) are in a face to face relationship, and the user A (100A) and the user D (100D) are not in a face to face relationship. Thus, it is determined that the user A (100A) and the user C (100C) are in a gathering place. That is, the measured position 1556A of the moving destination of the user A (100A) is corrected to a corrected position 1556B on the basis of the position 1554 that is the action starting point of the user C (100C). A correction method similar to that described above may be used.

Figure 16:
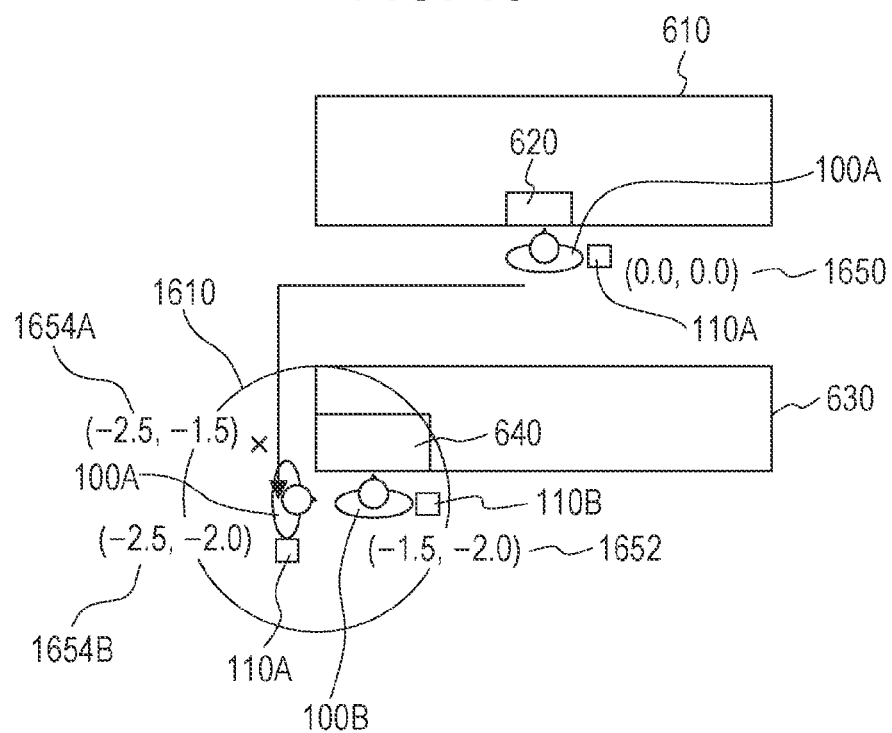
FIG. 16 illustrates an example of a process according to the exemplary embodiment.

FIG. 16 illustrates an example of a process according to this exemplary embodiment. It is assumed that the user A (100A) has moved from a position 1650 to talk to a user B (100B) at a position 1652.

For example, a measured position 1654A of the moving destination of the user A (100A) is (−2.5, −1.5) from the measurement data. In this case, since the action starting point of the user B (100B) is at the position 1652 (−1.5, −2.0), the correction module 150 may correct the current position of the user A (100A) to change the measured position 1654A of the user A (100A) to a corrected position 1654B (−2.5, −2.0) on the basis of the position of the gathering place (the position 1652 that represents the action starting point of the user B (100B)). Specifically, the correction module 150 performs correction on the basis of a measurement data table 1700 (FIG. 17) that is action information. At 00:00:20, which is specified in a "Time" column 1710, the difference between the directions (or orientations) of the user A (100A) and the user B (100B) is within a predetermined range. The predetermined range may be 180°±30°. That is, $$|90°-280°|<180°±30°.$$

Therefore, the user A (100A) and the user B (100B) satisfy the condition regarding direction information. The user A (100A) and the user B (100B) are in a gathering place, and the correction module 150 corrects the measured position 1654A of the user A (100A). Specifically, the correction module 150 adds −1.0 to the value in the x coordinate of the position 1652 (−1.5, −2.0) that is the action starting point of the user B (100B) to correct the measured position 1654A to the corrected position 1654B (−2.5, −2.0). While the correction module 150 performs correction using the position of the action starting point of the user B (100B), the current position (measurement data) of the user B (100B) may be used.

Figures 17, 18:
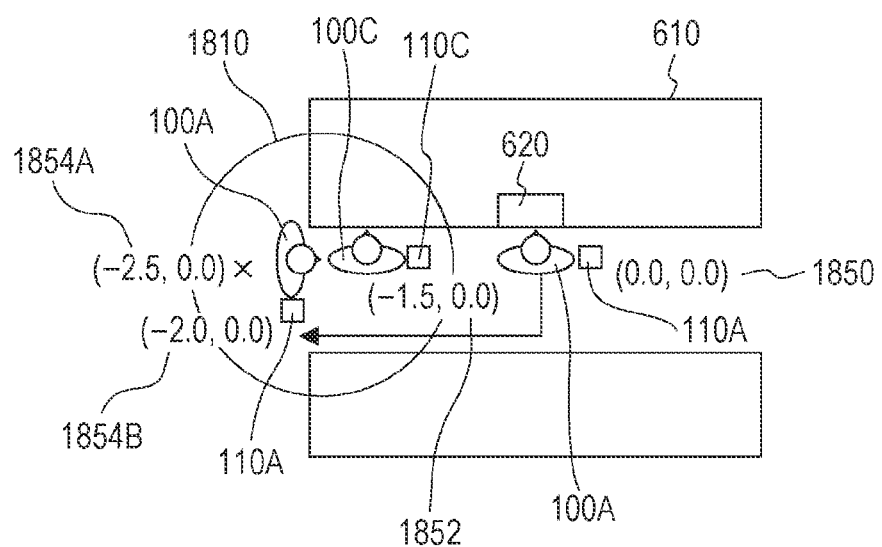
FIG. 17 illustrates an example data structure of a measurement data table.
FIG. 18 illustrates an example of a process according to the exemplary embodiment.

FIG. 18 illustrates an example of a process according to this exemplary embodiment. It is assumed that a user A (100A) has moved from a position 1850 to talk to a user C (100C) at a position 1852.

For example, a measured position 1854A of the moving destination of the user A (100A) is (−2.5, 0.0) from measurement data. In this case, since the action starting point of the user C (100C) is at the position 1852 (−1.5, 0.0), the correction module 150 may correct the current position of the user A (100A) to change the measured position 1854A of the user A (100A) to a corrected position 1854B (−2.0, 0.0) on the basis of the position of the position of the gathering place (the position 1852 that represents the action starting point of the user C (100C)). Specifically, the correction module 150 performs correction on the basis of a measurement data table 1900 (FIG. 19) that is action information. At 00:00:10, which is specified in a "Time" column 1910, the distance between the user A (100A) and the user C (100C) is within a predetermined range. The predetermined range may be within 1.0 for both the x coordinate and the y coordinate. That is, $$(-2.5,-0.0)-(-1.5,0.0)<=(1.0,1.0).$$

In addition, the difference between directions (or orientations) of the user A (100A) and the user C (100C) is within a predetermined range. The predetermined range may be 180°±30°. That is, $$|90°-280°|<180°±30°.$$

Therefore, the user A (100A) and the user C (100C) satisfy the conditions about position information and direction information. The user A (100A) and the user C (100C) are in a gathering place, and the correction module 150 corrects the measured position 1854A of the user A (100A). Specifically, the correction module 150 adds −0.5 to the value in the x coordinate of the position 1852 (−1.5, 0.0) that is the action starting point of the user C (100C) to correct the measured position 1854A to the corrected position 1854B (−2.0, 0.0). While the correction module 150 performs correction using the position of the action starting point of the user C (100C), the current position (measurement data) of the user C (100C) may be used.

Figures 19, 20:
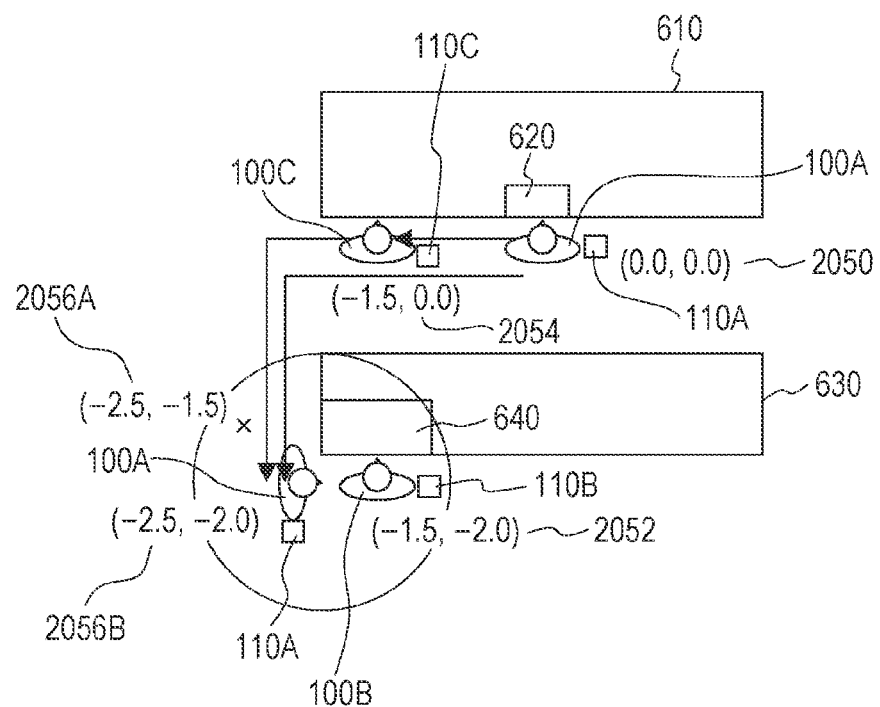
FIG. 19 illustrates an example data structure of a measurement data table.
FIG. 20 illustrates an example of a process according to the exemplary embodiment.

FIG. 20 illustrates an example of a process according to this exemplary embodiment. In the example described above, it is assumed that a statistically sufficient amount of action information about each user is accumulated, and the statistical values described above are used. However, a statistically sufficient amount of action information may not necessarily be accumulated depending on the user. In this case, the correction module 150 may perform correction using a statistically sufficient amount of action information about another user which has been accumulated.

In the example illustrated in FIG. 20, it is assumed that a user C (100C) has moved from a position 2054 to talk to a user B (100B) at a position 2052. It is assumed that a statistically sufficient amount of action information about a user A (100A) has been accumulated while not a statistically sufficient amount of action information about the user B (100B) and the user C (100C) has been accumulated.

For example, a measured position 2056A of the moving destination of the user C (100C) is (−2.5, −1.5) from measurement data. In this case, since the action starting point of the user B (100B) is at the position 2052 (−1.5, −2.0), the correction module 150 may correct the current position of the user C (100C) to change the measured position 2056A (−2.5, −1.5) of the user C (100C) to a corrected position 2056B (−2.5, −2.0) on the basis of the position of the gathering place (the position 2052 that represents the action starting point of the user B (100B)). Specifically, the correction module 150 performs correction on the basis of a measurement data table 2100 (FIG. 21) that is action information. At 00:00:20, which is specified in a "Time" column 2110, the distance between the user C (100C) and the user B (100B) is within a predetermined range. The predetermined range may be within 1.0 for both the x coordinate and the y coordinate. That is, $$(-2.5,-1.5)-(-1.5,-2.0)<=(1.0,1.0).$$

In addition, the difference between the directions (or orientations) of the user C (100C) and the user B (100B) is within a predetermined range. The predetermined range may be 180°±30°. That is, $$|90°-280°|<180°±30°.$$

Therefore, the user C (100C) and the user B (100B) satisfy the conditions about position information and direction information.

It is assumed that a statistically sufficient amount of action information about the user A (100A) has been accumulated and a statistically sufficient amount of information about correction performed when the user C (100C) gets together with the user B (100B) has also been accumulated. The accumulation of a statistically sufficient amount of information about correction may be implemented by, as illustrated in the example in the measurement data table 2100, storing information obtained before and after a correction is made. The term "accumulating" refers to storing of plural pieces of data of a specific type in a chronological order. The determination of whether or not a statistically sufficient amount of information about correction made by the correction module 150 may be performed by the correction module 150 by counting the number of stored pieces of information obtained before and after a correction is made and by determining whether or not the counted number of pieces of information is statistically sufficient.

Figures 21, 22:
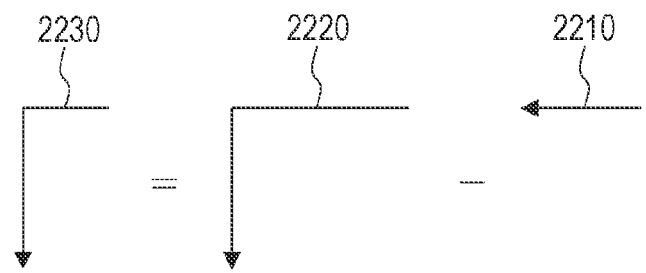
FIG. 21 illustrates an example data structure of a measurement data table.
FIG. 22 illustrates an example of a process regarding moving paths of subjects.

Then, the correction module 150 performs correction on the position of the moving destination of the user C (100C) in a way similar to that of previous correction performed when the user A (100A) got together with the user B (100B). FIG. 22 schematically illustrates the above correction operation. As illustrated in an example in FIG. 22, the correction module 150 removes a trajectory 2210 that is a path obtained when the user A (100A) got together with the user B (100B) from a trajectory 2220 that is a path obtained when the user A (100A) got together with the user C (100C), thereby obtaining a trajectory 2230 that is a path along which the user C (100C) will get together with the user B (100B).

The correction module 150 corrects the measured position 2056A of the moving destination of the user C (100C) in a way similar to that of the previous correction performed when the user A (100A) got together with the user B (100B). That is, as illustrated in the example in FIG. 16, the correction module 150 adds −1.0 to the value in the x coordinate of the position 2052 (−1.5, −2.0) that is the action starting point of the user B (100B) to correct the measured position 2056A to the corrected position 2056B (−2.5, −2.0).

That is, when correcting the position of the moving destination of the user C (100C) who has gotten together with the user B (100B), the correction module 150 performs correction in a way similar to that of the previous correction performed by the correction module 150 on the position of moving destination of the user A (100A) who got together to with the user B (100B).

Figure 23:
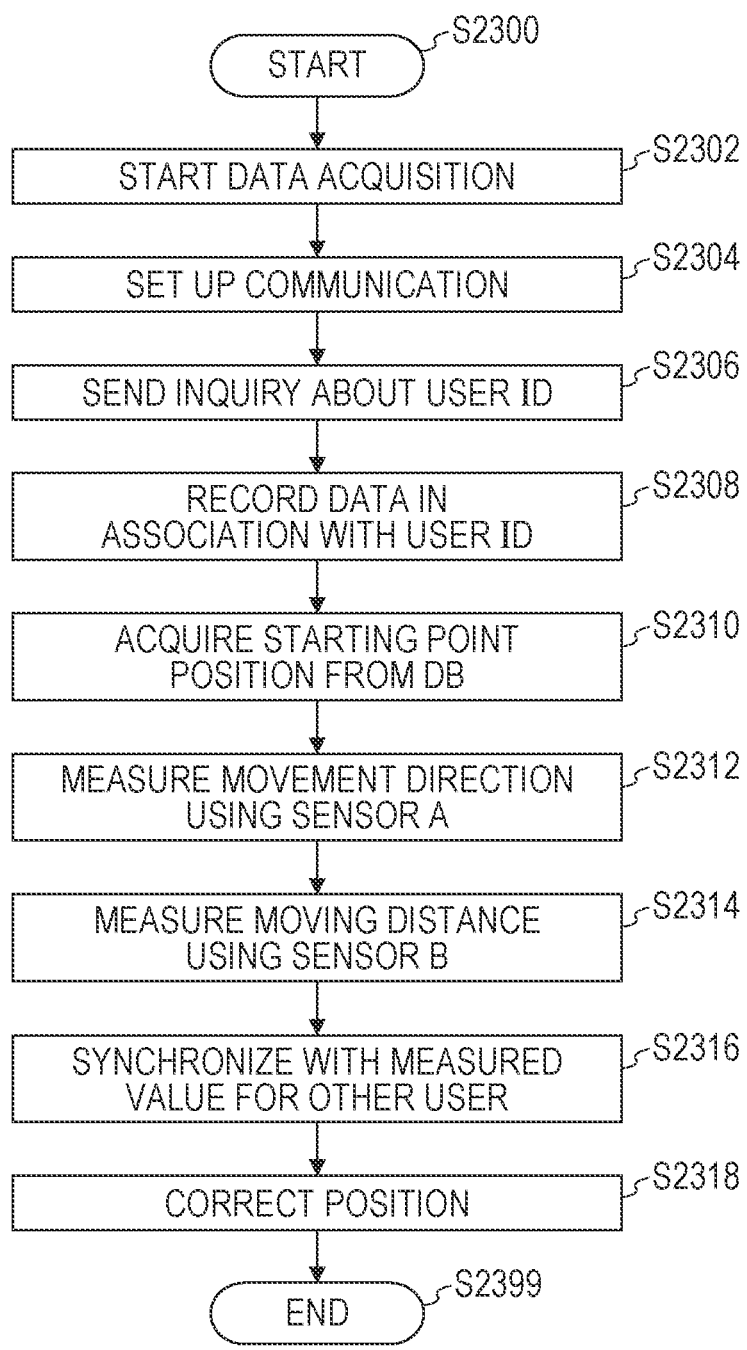
FIG. 23 is a flowchart illustrating an example of a process according to the exemplary embodiment.

FIG. 23 is a flowchart illustrating an example of a process according to this exemplary embodiment.

The processing of steps S2302 to S2314 is similar to the processing of steps S1002 to S1014 in the flowchart illustrated in the example in FIG. 10, respectively.

In step S2316, the measured value for the target user is synchronized with the measured value for another user. For example, when synchronized actions of users are detected, the state analysis processing module 144 changes a stride length.

In step S2318, when another user has moved to the position of the gathering place, the correction module 150 corrects the position of the other user who has moved to the position of the gathering place.

Figure 24:
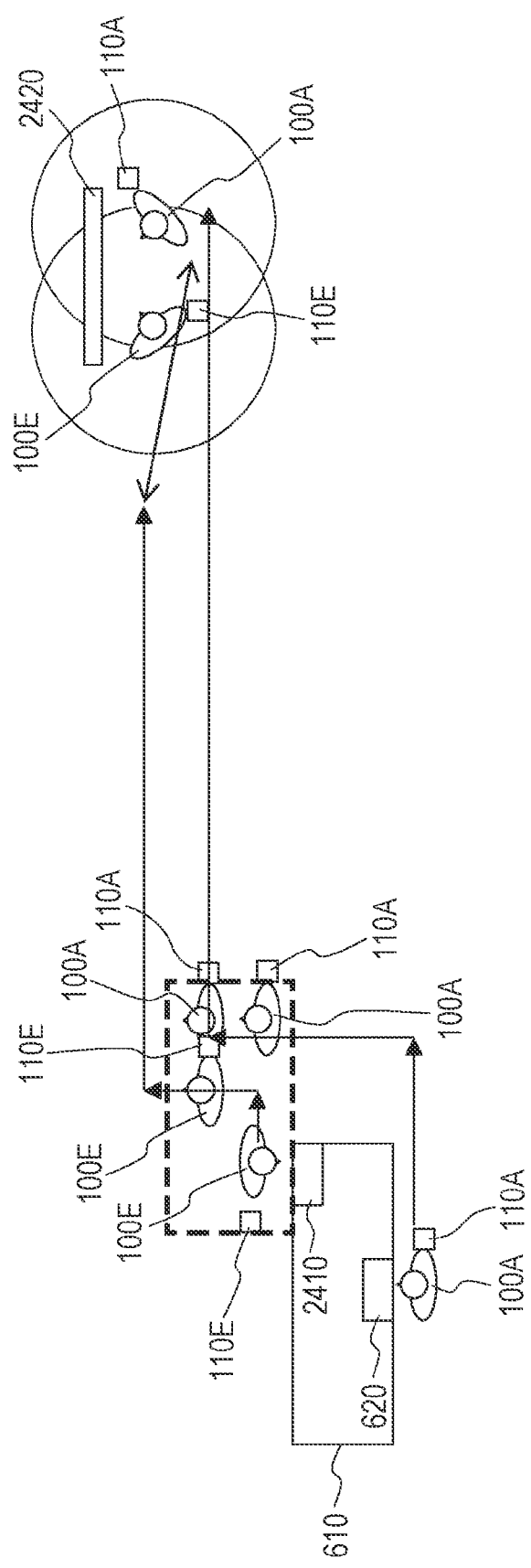
FIG. 24 illustrates an example of a process according to the exemplary embodiment.

FIG. 24 illustrates an example of a process according to this exemplary embodiment.

The moving distance of a user is calculated using measurement data obtained by the acceleration sensor, by counting the number of footsteps made by the user and multiplying the number of footsteps by the stride length of the user. A stride length may be determined by, for example, setting a value for each user through calculation using a result of the user walking ten steps. As illustrated in the example in FIG. 24, if plural users walk together, a user A (100A) and a user E (100E) may walk with the same stride length even if different stride lengths have been set for the user A (100A) and the user E (100E). In this case, different moving distances of the user A (100A) and the user E (100E) may be calculated, resulting in a possibility that the positions of the moving destinations of the user A (100A) and the user E (100E) will also be different. Therefore, in order to address dynamic changes in stride length when two or more users move together, the correction module 150 may specify a moving destination by specifying a synchronization phenomenon from action information about the users and dynamically correcting a stride length. That is, the position of a moving destination is calculated by equalizing the moving distances of the users and detecting the final stay condition (standing talking).

In the example illustrated in FIG. 24, a situation is illustrated where a user A (100A) who has been seated at a desk 620 walks to the front of a whiteboard 2420 together with a user E (100E) who has been seated at a desk 2410.

Figure 25A:
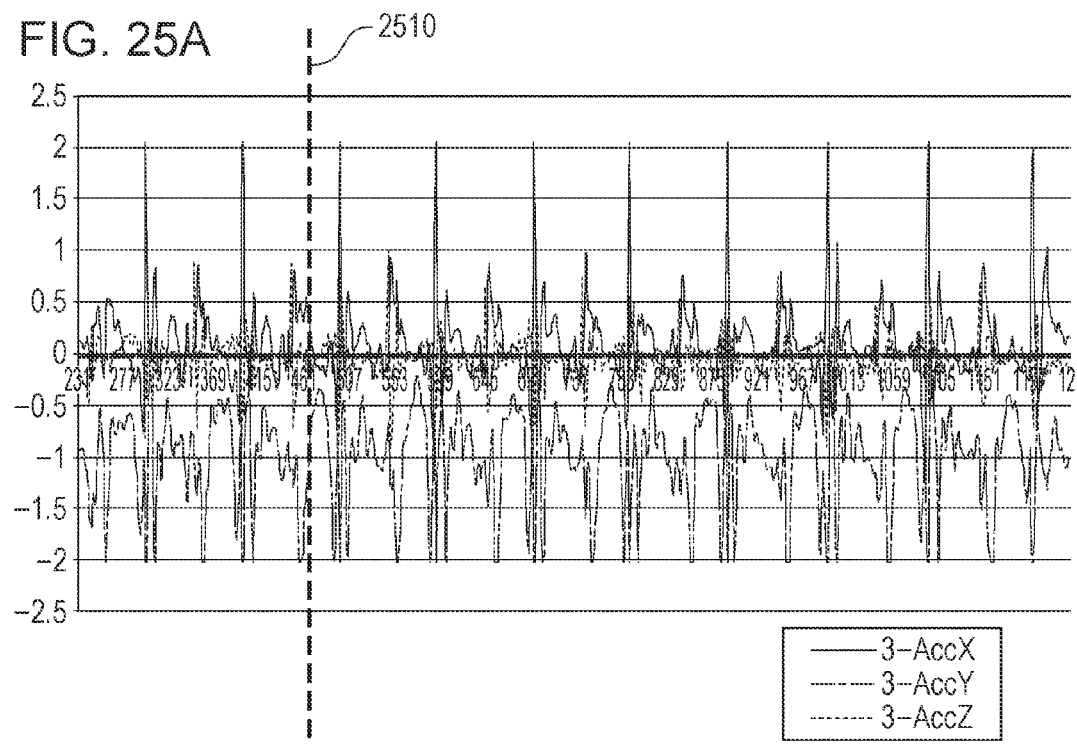
FIGS. 25A and 25B illustrate an example of the timing when synchronization starts.
Figure 25B:
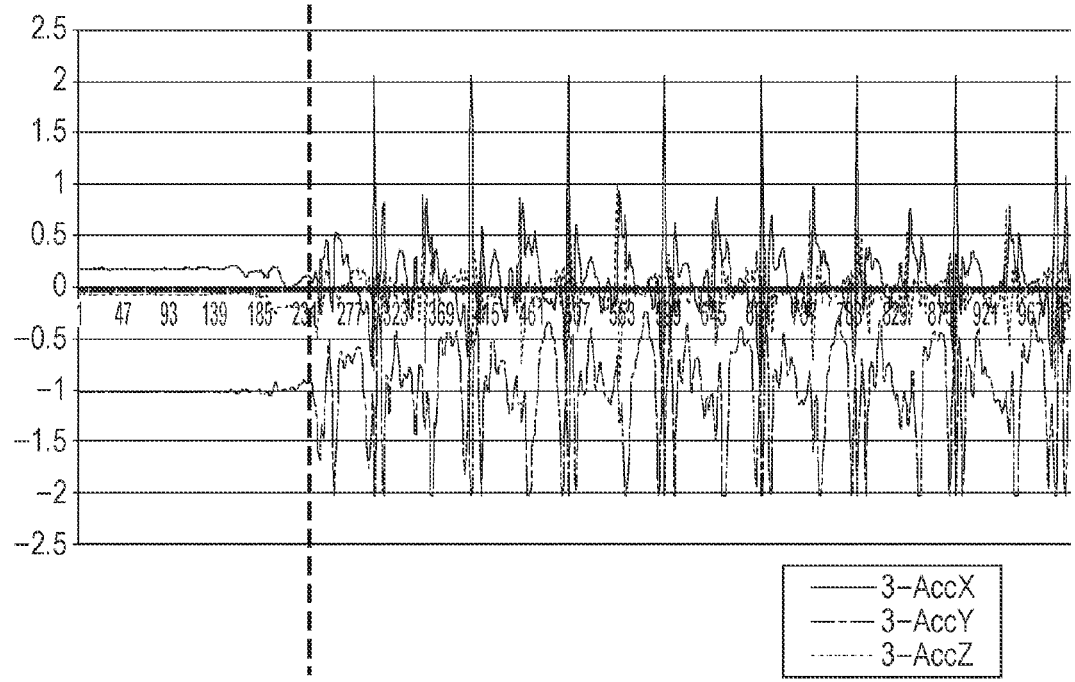

FIGS. 25A and 25B illustrate an example of the timing when synchronization starts. FIG. 25A illustrates acceleration data of the user A (100A), and FIG. 25B illustrates acceleration data of the user E (100E). The state analysis processing module 144 analyzes the acceleration data to detect that the user A (100A) has stopped at the position of the user E (100E) (short-time staying condition), then, the user E (100E) has stood up, and the user A (100A) and the user E (100E) have started walking. Further, the state analysis processing module 144 extracts a synchronization start time 2510 at which periods of counting the numbers of footsteps made by the user A (100A) and the user E (100E) match, and determines that the user A (100A) and the user E (100E) have started walking synchronously at the synchronization start time 2510.

If the start of synchronized walking is determined, the correction module 150 changes a stride length. In this case, the average value of the stride lengths of the user A (100A) and the user E (100E) may be used, or the longer stride length may be adjusted to the shorter one. Alternatively, the correction module 150 may set a stride length on the basis of the features of the user A (100A) and the user E (100E) who walk synchronously. For example, when plural users walk synchronously, because of the feature that a difference between the stride lengths of the users is within a predetermined range, a stride length is changed to a stride length less than or equal to a predetermined upper limit.

In addition, if the moving destination is within a predetermined range from a device position registered in a map (such as the front of the whiteboard 2420 or the front of a bulletin board), the correction module 150 may correct the position of the moving destination using the registered device position.

FIG. 26 illustrates an example of a process according to this exemplary embodiment. In the foregoing examples, the position of an action starting point or a registered device position is used. However, the correction module 150 may perform correction using a gathering place where plural users are together. While a gathering place has been described in the context of the position of an action starting point by way of example, the following description will be given in the context of a dynamically generated gathering place rather than an action starting point.

In the example illustrated in FIG. 26, it is assumed that the user A (100A) and the user E (100E) walk together and stop and talk at a position 2656. It is also assumed that, after that, a user C (100C) walks from a position 2652 to the place where the user A (100A) and the user E (100E) are talking, and joins the talk. In this case, the gathering place where the user A (100A) and the user E (100E) are together is detected as a node in the manner described above. Then, the position at which the user C (100C) stops is detected from the measurement data of the user C (100C). If the position at which the user C (100C) stops and the position of the gathering place are within a predetermined range, the correction module 150 corrects the position of the user C (100C) on the basis of the direction information about the user A (100A), the user E (100E), and the user C (100C), the relationship information between the user A (100A) and the user C (100C), and the relationship information between the user E (100E) and the user C (100C). The correction module 150 may perform correction based on direction information by using the correction method of the correction module 150 described above with reference to the examples in FIGS. 16 and 17. Further, the correction module 150 may perform correction based on relationship information by using the correction method of the correction module 150 described above with reference to the examples in FIGS. 11 and 13. Alternatively, the correction module 150 may perform correction only using relationship information in order to address the situation where users are talking in front of a whiteboard, that is, the situation where users are not facing each other.

Figure 27:
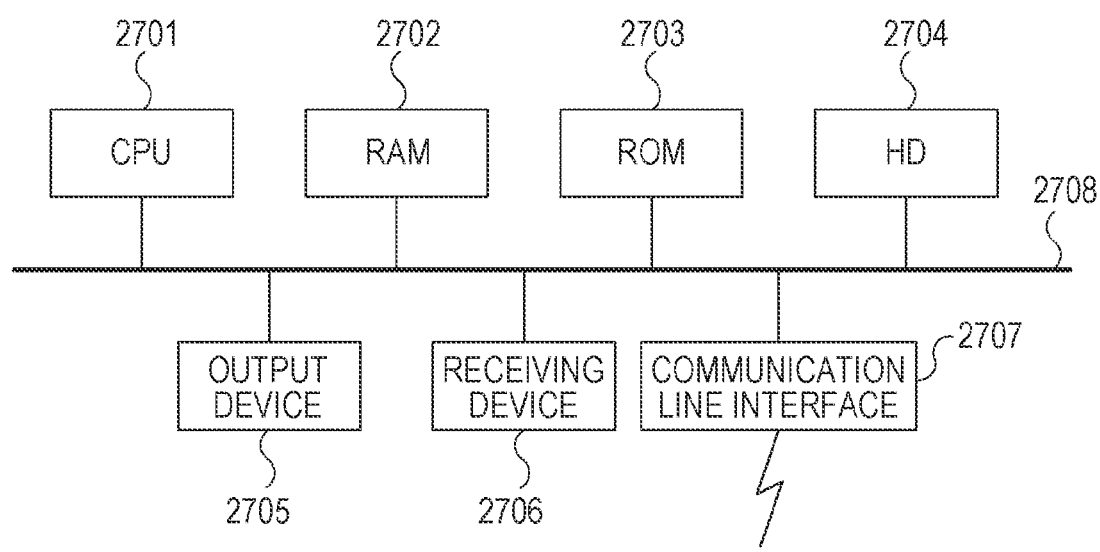
FIG. 27 is a block diagram illustrating an example hardware configuration of a computer for implementing the exemplary embodiment.

FIG. 27 illustrates an example hardware configuration of a computer that executes a program according to this exemplary embodiment. The computer may be a general computer, specifically, a personal computer, a computer capable of serving as a server, or the like. Specifically, the computer includes a processing unit (arithmetic unit) including a CPU 2701, and a storage device including a RAM 2702, a read-only memory (ROM) 2703, and a hard disk (HD) 2704. For example, a hard disk may be used as the HD 2704. The computer includes the CPU 2701 that executes a program implementing the communication setup detection module 122, the measurement data recording module 124, the state analysis processing module 144, the physical layout matching module 146, the ID matching module 148, the correction module 150, the output module 152, and the like; the RAM 2702 that stores the program and data; the ROM 2703 that stores a program for booting the computer, and any other suitable item; the HD 2704 that serves as an auxiliary storage device; a receiving device 2706 that receives data in accordance with an operation of a user through a keyboard, a mouse, a touch panel, or any other suitable tool; an output device 2705 such as a cathode-ray tube (CRT) or a liquid crystal display; a communication line interface 2707 for establishing a connection with a communication network, such as a network interface card; and a bus 2708 through which the above components are connected to one another to exchange data. Multiple computers each having the above configuration may be connected to one another via a network.

In the foregoing exemplary embodiment, generally, after the conversion from the relative coordinates to the absolute coordinates, the correction module 150 corrects position information about a subject. However, the correction module 150 may correct position information about a subject using the relative coordinates. In the foregoing exemplary embodiment, furthermore, the correction module 150 corrects position information about a subject after determining the position of a starting point. However, the correction module 150 may correct position information about a subject, without determining the position of a starting point (or before determining the position of a starting point), after determining a gathering place.

In the foregoing exemplary embodiment, elements based on a computer program may be implemented by causing a system having the above hardware configuration to read the computer program, or software, and software and hardware resources cooperate with each other, thereby achieving the foregoing exemplary embodiment.

The hardware configuration illustrated in FIG. 27 is merely an example configuration, and this exemplary embodiment is not limited to the configuration illustrated in FIG. 27 so long as to be capable of executing the modules described in the exemplary embodiment. For example, some modules may be configured using dedicated hardware (such as an application specific IC (ASIC)), and other modules may be provided in an external system and may be connected via a communication line. Alternatively, multiple systems each having the configuration illustrated in FIG. 27 may be connected to one another via a communication line and may operate in association with one another. Furthermore, the system illustrated in FIG. 27 may be incorporated in, in particular, a personal computer, a home information appliance, a copying machine, a facsimile machine, a scanner, a printer, a multifunctional device (an image processing apparatus having at least two of functions of devices such as scanner, printer, copier, and facsimile functions), or the like.

Processes in the foregoing exemplary embodiment may be used in combination, and any suitable technique of the related art may be used as a process to be performed by each module.

In the foregoing exemplary embodiment, the phrases "greater than or equal to", "less than or equal to", "greater than", and "smaller than (or less than)" a predetermined value or equivalent phrases may be read as "greater than", "smaller than (or less than)", "greater than or equal to", and "less than or equal to" a predetermined value, respectively, as long as consistency is maintained in the respective combinations.

A program described herein may be provided in the form of being stored in a recording medium, or may be provided via a communication medium. In this case, for example, a computer readable medium storing the program described above may constitute an exemplary embodiment of the present invention.

The computer readable recording medium may be a computer readable recording medium storing a program, which is used for installation, execution, distribution, or the like of the program.

Examples of the recording medium include digital versatile discs (DVDs) including discs complying with a DVD Forum standard, such as DVD-Recordable (DVD-R), DVD-Rewritable (DVD-RW), and DVD-RAM discs, and discs complying with a format supported by the DVD+RW Alliance, such as DVD+R and DVD+RW discs, compact discs (CDs) including compact disc read-only memory (CD-ROM), CD-Recordable (CD-R), and CD-Rewritable (CD-RW) discs, a Blu-ray Disc (registered trademark), a magneto-optical (MO) disk, a flexible disk (FD), a magnetic tape, a hard disk, a ROM, an electrically erasable programmable read-only memory (EEPROM), a flash memory, a RAM, and a Secure Digital (SD) memory card.

The above program or a portion thereof may be recorded in any of the above recording media for saving, distribution, or the like, or may be transmitted via communication using a transmission medium such as a wired network or a wireless communication network, which is used for a local area network (LAN), a metropolitan area network (MAN), a wide area network (WAN), the Internet, an intranet, an extranet, and the like, or a combination thereof, or carried on a carrier.

Furthermore, the program described above may be part of another program, or may be recorded on a recording medium together with a different program. The program may also be recorded separately on plural recording media. The program may also be recorded in any form being capable of restored such as compressed or encoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a server comprising:
at least one processor; and
a memory;
wherein the at least one processor is configured to execute:
an analysis unit configured to analyze an action history including at least a position of a subject, in accordance with action information obtained by detecting an action of the subject using an action detection sensor provided on the subject;
a gathering place determination unit configured to determine a position of a gathering place where a plurality of subjects including the subject are together, in accordance with position information indicating the position of the subject, the position information being included in the action information obtained by detecting the action of the subject using the action detection sensor provided on the subject; and a correction unit configured to correct position information about the subject, in accordance with the position of the gathering place determined by the gathering place determination unit, wherein the analysis unit is configured to, in response to a plurality of subjects moving synchronously within a predetermined range, analyze an action history of movement of the plurality of subjects with predetermined stride lengths of the plurality of subjects being corrected so as to match to thereby generate a corrected analysis result, and update respective action starting points stored the memory for each one of the plurality of subjects using the corrected analysis result.

2. The information processing apparatus according to claim 1, wherein the correction unit is configured to further correct the position information about the subject, in accordance with the a respective action starting point of another one of the plurality of subjects.

3. The information processing apparatus according to claim 1, wherein the correction unit is configured to, in response to another one of the plurality of subjects having moved to the position of the gathering place, correct a position of the another one of the plurality of subjects that has moved to the position of the gathering place, in accordance with direction information about the plurality of subjects in the gathering place and direction information about the another one of the plurality of subjects or in accordance with relationship information indicating a relationship between the another one of the plurality of subjects and the plurality of subjects in the gathering place.

4. The information processing apparatus according to claim 1, wherein the at east one processor is further configured to execute:

a map generation unit configured to generate a map including an action starting point of the subject and a path along which the subject has moved, the action starting point being a point at which a desk is located, the path being an aisle.

5. The information processing apparatus according to claim 1, wherein the gathering place determination unit is configured to determine the position of the gathering place where the plurality of subjects are together, in accordance with the action history of the subject analyzed by the analysis unit and the position information indicating the position of the subject, the position information being included in the action information.

6. The information processing apparatus according to claim 1, wherein the gathering place determination unit is configured to determine the position of the gathering place where the plurality of subjects are together, in accordance with position information indicating the position of the subject and direction information indicating a direction of the subject, the position information and the direction information being included in the action information.

7. An information processing method comprising:

analyzing, by at least one processor of a server comprising a memory, an action history including at least a position of a subject, in accordance with action information obtained by detecting an action of the subject using an action detection sensor provided on the subject;

determining, by the at least one processor, a position of a gathering place where a plurality of subjects including the subject are together, in accordance with position information indicating the position of the subject, the position information being included in the action information obtained by detecting the action of the subject using the action detection sensor provided on the subject;

correcting, by the at least one processor, position information about the subject, in accordance with the determined position of the gathering place; and in response to a plurality of subjects moving synchronously within a predetermined range, analyzing, by the at least one processor, an action history of movement of the plurality of subjects with predetermined stride lengths of the plurality of subjects being corrected so as to match to thereby generate a corrected analysis result, and updating respective action starting points stored in the memory for each one of the plurality of subjects using the corrected analysis result.

8. A non-transitory computer readable medium storing a program causing a computer to execute a process for performing information processing, the process comprising:

analyzing, by at least one processor of a server comprising a memory, an action history including at least a position of a subject, in accordance with action information obtained by detecting an action of the subject using an action detection sensor provided on the subject;

determining, by the at least one processor, a position of a gathering place where a plurality of subjects including the subject are together, in accordance with position information indicating the position of the subject, the position information being included in the action information obtained by detecting the action of the subject using the action detection sensor provided on the subject;

correcting, by the at least one processor, position information about the subject, in accordance with the determined position of the gathering place; and in response to a plurality of subjects moving synchronously within a predetermined range, analyzing, by the at least one processor, an action history of movement of the plurality of subjects with predetermined stride lengths of the plurality of subjects being corrected so as to match to thereby generate a corrected analysis result, and updating respective action starting points stored in the memory for each one of the plurality of subjects using the corrected analysis result.

* * * * *